(12) United States Patent
Mujtaba et al.

(10) Patent No.: US 8,737,280 B2
(45) Date of Patent: May 27, 2014

(54) ADAPTIVE RECEIVE DIVERSITY DURING DISCONTINUOUS RECEPTION IN MOBILE WIRELESS DEVICE

(75) Inventors: Syed A. Mujtaba, Santa Clara, CA (US); Kee-Bong Song, Santa Clara, CA (US); Xiaowen Wang, Cupertino, CA (US); Young Jae Kim, San Jose, CA (US); Vinay R. Majjigi, Sunnyvale, CA (US); Johnson O. Sebeni, Fremont, CA (US); Romain Trilling, Cupertino, CA (US); Tahir Shamim, San Jose, CA (US); Karthik Anantharaman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 13/231,804

(22) Filed: Sep. 13, 2011

(65) Prior Publication Data

US 2013/0064151 A1    Mar. 14, 2013

(51) Int. Cl.
*G08C 17/00* (2006.01)
*H04B 1/16* (2006.01)

(52) U.S. Cl.
USPC ........................................ 370/311; 455/343.2

(58) Field of Classification Search
USPC ............................ 370/252, 331, 338; 455/522
See application file for complete search history.

(56) References Cited

U.S. PATENT DOCUMENTS

| | | | |
|---|---|---|---|
| 6,778,815 B1 * | 8/2004 | Enoki ........................ | 455/277.2 |
| 7,369,632 B2 | 5/2008 | Tapaninen et al. | |
| 2006/0227734 A1 * | 10/2006 | Tu et al. ........................ | 370/311 |
| 2007/0060095 A1 | 3/2007 | Subrahmanya et al. | |
| 2007/0066268 A1 | 3/2007 | Simic et al. | |
| 2007/0087698 A1 * | 4/2007 | Lee .................................. | 455/69 |
| 2009/0168914 A1 | 7/2009 | Chance et al. | |
| 2009/0219861 A1 | 9/2009 | Higuchi et al. | |
| 2010/0002611 A1 * | 1/2010 | Umatt et al. .................. | 370/311 |
| 2011/0122784 A1 * | 5/2011 | Ananthanarayanan et al. ............................ | 370/252 |

FOREIGN PATENT DOCUMENTS

| | | |
|---|---|---|
| WO | WO 01/59945 A1 | 8/2001 |
| WO | WO 2008/071600 A1 | 6/2008 |

* cited by examiner

*Primary Examiner* — Hoon J Chung
*Assistant Examiner* — Yaotang Wang
(74) *Attorney, Agent, or Firm* — Paradigm IP Law, PC; Ross L. Franks

(57) ABSTRACT

A mobile wireless device adapts receive diversity during discontinuous reception based on downlink signal quality, page indicators and page messages. When the downlink signal quality exceeds a pre-determined threshold, the mobile wireless device decodes a page indicator channel through an initial antenna, and otherwise, decodes a paging channel through the initial antenna without decoding the page indicator channel. The mobile wireless device switches to decoding the paging channel through an alternate antenna when a page indicator decodes as an erasure. When a paging message received through a single antenna decodes with an incorrect error checking code, the mobile wireless devices enables receive diversity through multiple antennas for subsequent decoding. The mobile wireless device switches between single antenna reception and multiple antenna reception based on tracking multiple consecutive error checking code failures and successes.

22 Claims, 21 Drawing Sheets

ADAPTIVE RECEIVE DIVERSITY DURING DISCONTINUOUS RECEPTION IN MOBILE WIRELESS DEVICE

TECHNICAL FIELD

The described embodiments generally relate to methods and apparatuses for adapting receive diversity for mobile wireless devices. More particularly, the present embodiments describe selective use of receive diversity for mobile wireless devices with multiple receivers and multiple antennas during discontinuous reception modes.

BACKGROUND

Mobile wireless devices in wireless networks can be designed to balance advanced communication capabilities with limited available power storage, particularly in devices with smaller form factors that offer "high performance" features such as provided in "smart" phones. Analog signal reception and signal processing by the mobile wireless device can consume significant amounts of power when active that can affect battery drain in the mobile device. Continuous reception of radio frequency signals, even when not establishing or maintaining an active connection with the wireless network, can reduce the operating time of the mobile wireless device unnecessarily. In an "idle" state, during which the mobile wireless device may not be not actively connected to the wireless network, the mobile wireless device can receive and process signals selectively rather than continuously to reduce power consumption. Active circuitry in the mobile wireless device can be limited to components needed to receive and decode signaling messages from the wireless network. Wireless communication standards can specify procedures that can provide for lower power consumption by allowing the mobile wireless device to cycle between a non-active "sleep" state and an active "wake" state in a process known as discontinuous reception (DRX). Newer mobile wireless devices can also include multiple antennas connected to multiple receivers that can each consume power. During an active wake cycle, the mobile wireless device can selectively receive signals through one or more antennas, adapting the number of antennas used and the number of active receivers that process signals based on received signal conditions to balance performance of wireless reception with local battery power consumption.

Wireless networks continue to evolve as new communication technologies develop and standardize. Current wireless network deployments include many variations in architecture, including support for different wireless communication technologies offered by one or more wireless network service providers. A representative wireless network for a wireless network service provider can include support for one or more releases of wireless communication protocols specified by the Third Generation Partnership Project (3GPP) and Third Generation Partnership Project 2 (3GPP2) communication standards organizations. The 3GPP develops mobile communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 develops mobile communication standards that include CDMA2000 1×RTT standards. Each of the standards listed above include a form of discontinuous reception (DRX) in which one or more receivers (or transceivers) in a mobile wireless device can be disabled periodically to save power consumption and then be selectively enabled to listen for signaling messages transmitted by the wireless network. The signaling messages can be used to initiate connections between the specific mobile wireless device and the wireless network as well as to broadcast information to multiple mobile wireless devices for operation in the wireless network.

Representative signaling messages include paging indicators sent in one or more paging indicator channels and paging messages (or more generally signaling/control messages) transmitted in parallel paging (signaling/control) channels. The mobile wireless device can monitor a paging channel directly or can monitor a paging indicator channel for paging indicators that can point to a forthcoming paging message on a paging channel As a paging indicator can be as short as one bit, variations in received signal quality conditions can corrupt the page indicator bit and can potentially result in the mobile wireless device missing page messages or reading page messages intended for other mobile wireless devices and thus wasting power consumption in the mobile wireless device unnecessarily. The mobile wireless device can adapt reception based on measured receive signal quality and/or receive signal strength to improve reception of the signaling messages. The mobile wireless device can enable multiple receivers to improve signal reception of paging indicators on the paging indicator channel and/or paging messages on the paging channel. For mobile wireless devices that support receive diversity with multiple antennas and multiple receivers, power consumption during signal reception can depend on the number of active receivers. The performance of decoding received can depend on the quality of signals received through one or more antennas, each of which can be connected to one or more receivers. Thus there exists a need for methods and apparatuses to adapt receive diversity in a mobile wireless device that can improve signal reception while limiting power consumption during discontinuous reception in the wireless network.

SUMMARY OF THE DESCRIBED EMBODIMENTS

In one embodiment, a method of adapting receive diversity in a mobile wireless device is described. The method includes at least the following steps. During a discontinuous reception cycle, a mobile wireless device decodes page indicators and/or page messages through one or more antennas. When a measured downlink signal quality exceeds a pre-determined threshold, the mobile wireless device decodes at least one page indicator received on a page indicator channel through the initial antenna. When the measured downlink signal quality does not exceed the pre-determined threshold, the mobile wireless device decodes the paging channel using the initial antenna without decoding page indicators on the page indicator channel When the first page indicator decodes as an erasure, the mobile wireless device decodes a page message received on a paging channel through an alternate antenna. When the mobile wireless device decodes page messages through the initial antenna or through the alternate antenna alone and no received page message decodes with a correct error checking code, the mobile wireless device decodes one or more page messages using receive diversity through the initial antenna and through the alternate antenna together.

In another embodiment, a mobile wireless device includes a first receiver, a second receiver, a first antenna, a second antenna, a switch and a configurable processor. The switch interconnects the first and second receivers to the first and second antennas. The processor is configured to switch signal reception of a paging channel between the first antenna and the second antenna based on decoding of a received page indicator on a page indicator channel. The processor is further configured to enable signal reception through both the first and second antennas and signal processing in the first and second receivers following decoding an incorrect error checking code in a paging message received on the paging channel. The processor is also configured to re-enable signal reception through only one of the first and second antennas and only one of the first and second receivers following decoding of multiple correct error checking codes on multiple consecutive paging messages received on the paging channel.

In a further embodiment, non-transitory computer program product encoded in a non-transitory computer readable medium of adapting receive diversity in a mobile wireless device is described. The non-transitory computer program product in the mobile wireless device includes at least the following non-transitory computer program code. Non-transitory computer program code for enabling reception of signaling messages through one antenna and one receiver or through more than one antenna and more than one receiver based on measurements of received downlink signal quality. Non-transitory computer program code for choosing through which antenna and through which receiver to receive the signaling messages based on measurements of downlink signal strength received through each antenna. Non-transitory computer program code for switching from single antenna reception to multiple antenna reception following multiple consecutive error checking code failures on received signaling messages. Non-transitory computer program code for switching from multiple antenna reception to single antenna reception following multiple consecutive error checking code successes on received signaling messages.

Although described in terms of a generic wireless network and a specific CDMA2000 1× wireless network, the embodiments disclosed herein can be extended to include other wireless networks such as GSM/GPRS, UMTS, LTE and LTE Advanced networks as well.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
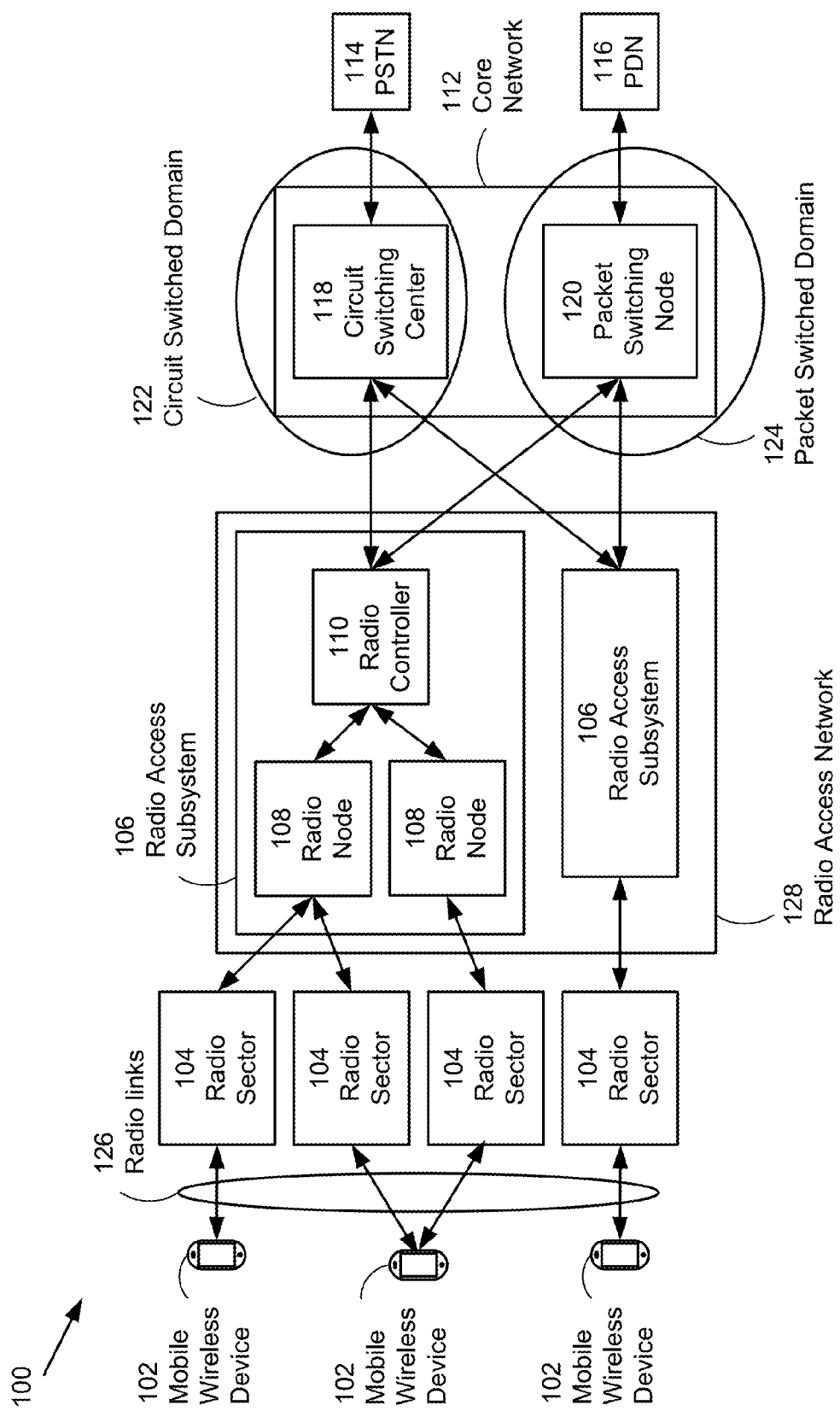
FIG. 1 illustrates components of a generic wireless communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for adapting receive diversity in a wireless mobile device, and in particular to selective use of receive diversity for the mobile wireless device operating with multiple antennas and multiple receivers during discontinuous reception cycles. It should be understood that implementations of the same methods and apparatuses described herein can apply to mobile wireless devices used in different types of wireless networks. For example, the same teachings can be applied to a GSM network, a UMTS network, an LTE network or other wireless network that uses discontinuous reception. In general, the teachings described herein can apply to a mobile wireless device operating in a wireless network based on radio access technology. The specific examples and implementations described herein are presented for simplicity in relation CDMA2000 1× networks but also can apply to other wireless network environments.

Mobile wireless devices can offer advanced communication capabilities, including increasing data transfer speeds, access to multiple types of wireless networks and robust performance in the presence of varying levels of noise and interference. At the same time, manufacturers of a mobile wireless device can seek to improve "stand-by" time of the mobile wireless device by minimizing power consumption from limited battery storage available within the mobile wireless device. Thus, a balance between robust performance and power consumption can be sought. To improve signal reception performance, the mobile wireless device can include multiple receivers interconnected to multiple antennas. Signals received on different antennas in the same mobile wireless device can each provide different signal quality levels and different signal strengths depending on the antennas' locations as well as an orientation of the mobile wireless device with respect to a transmitting radio access system in the wireless network. In addition, intervening obstructions that can block and reflect transmitted signals can significantly affect signal reception at the mobile wireless device. The mobile wireless device can select to use one of a plurality of antennas and receivers based on signal and decoding measurements. The mobile wireless device can also enable receive diversity selectively to receive signals through more than one of the plurality of antennas as required to provide reliable reception of critical signaling messages received from the wireless network. Measurements of received downlink signal strength and/or received downlink signal quality can be used by the mobile wireless device to select among the plurality of antennas and when to use one or multiple antennas.

Continuous reception through one or more sets of analog receive circuitry in the mobile wireless device can consume significantly more power than selective discontinuous reception of signals received during periods when the mobile wireless device is not actively connected to the mobile wireless network. When using a non-slotted mode, the mobile wireless device can listen continuously on a signaling channel for signaling messages that can be used to initiate establishment of an active connection between the mobile wireless device and the wireless network. Representative signaling messages can include paging messages transmitted on a paging channel. As signaling channels, such as the paging channel, can be shared among multiple mobile wireless devices, the wireless network can divide transmissions on the signaling channel into individual slots and can assign to each mobile wireless device within a limited geographic area covered by a radio sector (cell) of the wireless network a time slot in which to listen for paging messages on the paging channel. Thus, the mobile wireless device can preferentially listen for signaling messages during assigned time slots rather than listen continuously. This selective listening can be referred to as operating in a slotted mode. In addition, the mobile wireless device can disable one or more receivers in the mobile wireless device during time slots not assigned to the mobile wireless device, the mobile wireless device can reduce power consumption by operating in the slotted discontinuous reception mode rather than the non-slotted continuous reception mode.

In certain wireless networks, such as a CDMA2000 1× network, a separate signaling channel, e.g. a paging indicator channel, can provide an indication to the mobile wireless device of a signaling (paging) message forthcoming on the parallel paging channel Paging indicators on the page indicator channel can be significantly shorter and easier to decode than paging messages, and thus by listening for shorter transmissions on the paging indicator channel with simpler circuitry rather than for longer transmissions directly on the paging channel with more complex circuitry, the mobile wireless device can further reduce power consumption when there is no paging message intended for the mobile wireless device. When the mobile wireless device receives a positive indication on the paging indicator channel, the mobile wireless device can listen for a subsequent paging message on the paging channel In contrast, when the mobile wireless device receives a negative indication on the paging indicator channel, the mobile wireless device can skip listening to the paging channel and return to a sleep state to conserve power.

Messages received on the paging indicator channel can be quite short, for example only one bit in length, and can be interpreted as a positive indication, a negative indication or an indefinite indication of a paging message addressed to the mobile wireless device on the paging channel. The mobile wireless device can measure downlink signal quality and can selectively listen to the paging indicator channel when the measured downlink signal quality exceeds a pre-determined threshold. Under good received signal conditions, a single bit indicator on the paging indicator channel can provide a reliable indication of the presence of paging messages for the mobile wireless device on the paging channel When the measured downlink signal quality does not exceed the pre-determined threshold, however, the mobile wireless device can listen directly to the paging channel instead and can ignore the paging indicator channel, as single bits received on the paging indicator channel with poor signal conditions can provide an unreliable indication of the availability of paging messages. The paging indicator channel can include multiple copies of paging indications to improve reliable reception. The mobile wireless device can choose to listen for one or more of the multiple copies of the paging indicators. The mobile wireless device can also select to receive signals from different antennas based on interpreted values for one or more indicator bits received on the paging indicator channel. When an indicator bit received through one antenna can be interpreted as "indefinite", the mobile wireless device can choose to receive another copy of the indicator bit through a different antenna in order to provide a clearer indication of forthcoming paging messages.

Each paging message received on the paging channel can include an error checking code, e.g. a cyclic redundancy check (CRC), that can confirm integrity of the data contained in the paging message. When unable to locate a paging message with a "good" CRC on the paging channel for a pre-determined period of time, or after receiving a pre-determined number of consecutive paging messages with incorrect error checking codes, i.e. with "bad" CRC, the mobile wireless device can enable reception through multiple antennas and receivers simultaneously, i.e. full receive diversity, in order to improve signal reception in the presence of noise and interference. Full receive diversity can provide more reliable signal reception when receive signal conditions are poor, while single antenna and single receiver reception can provide reduced power consumption when receive signal conditions are good. Full receive diversity can be used for reception of signals on the paging channel, while single antenna and single receiver reception can be used for signals received on both the paging indicator channel and the paging channel These and other embodiments are discussed below with reference to FIGS. 1-15. However, those skilled in the art will readily appreciate that the detailed description given herein with respect to these figures is for explanatory purposes only and should not be construed as limiting.

FIG. 1 illustrates a representative generic wireless communication network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency carrier at a selected frequency. Radio sectors 104 can have different geometric shapes depending on a transmission antenna configuration, such as radiating outward in an approximate circle or hexagon from a centrally placed radio node 108 or cone shaped for a directional antenna from a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126. To form a mobile terminated connection between the mobile wireless device 102 and the radio access network 128, a radio controller 110 in the radio access subsystem 106 can instruct the radio node to transmit a signaling message, such as a page message, to the mobile wireless device 102. In certain networks, the radio controller 110 can also instruct the radio node to transmit a signaling indicator, such as a page indicator bit, in advance of the page message to provide notice to the mobile wireless device 102 of the forthcoming page message. Upon reception of the page message, and following an additional exchange of signaling messages with the radio access network 128, the mobile wireless device can form an active connection with the wireless network 100.

In some wireless networks 100, the mobile wireless device 102 can be connected to more than one radio sector 104 simultaneously. The multiple radio sectors 104 to which the mobile wireless device 102 is connected can come from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
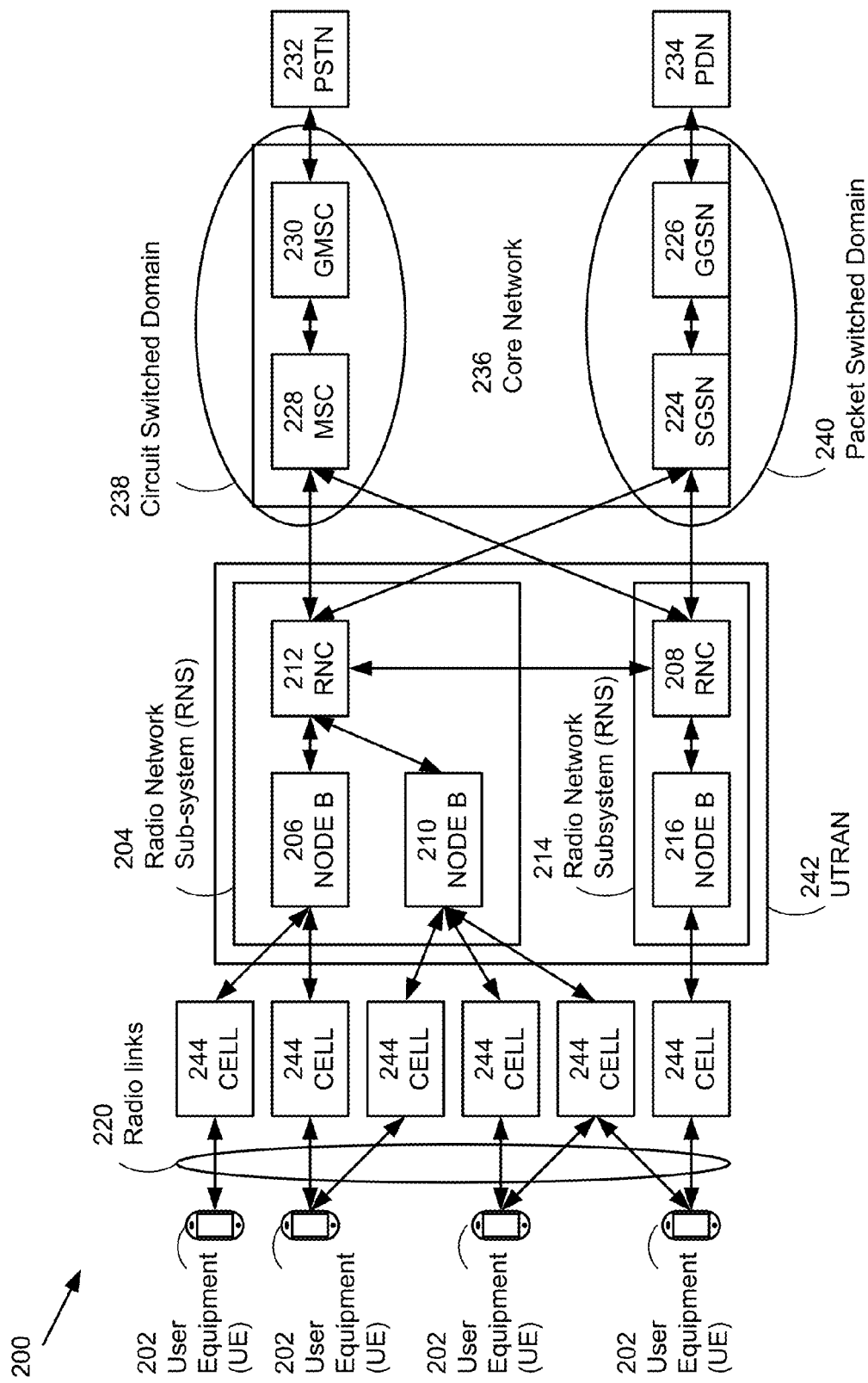
FIG. 2 illustrates components of a UMTS wireless communication network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network sub-systems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and destined to the UE 202. Each RNC 208/212 can handle the assignment and management of radio resources for the cells 244 through which the UE 202 connect to the wireless network 200 and can operate as an access point for the UE 202 with respect to the core network 236. In order to establish a connection, the RNC 208/212 can communicate with the UE 202 through an associated Node-B 206/210/216 using a series of signaling messages. The Node-B 206/210/216 can receive information sent by the physical layer of UE 202 through an uplink and transmit data to UE 202 through a downlink and can operate as access points of the UTRAN 242 for UE 202.

UTRAN 242 can construct and maintain a radio access bearer (RAB) for communication between UE 202 and the core network 236. Services provided to a specific UE 202 can include circuit switched (CS) services and packet switched (PS) services. For example, a general voice conversation can be transported through a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet".

Figure 3:
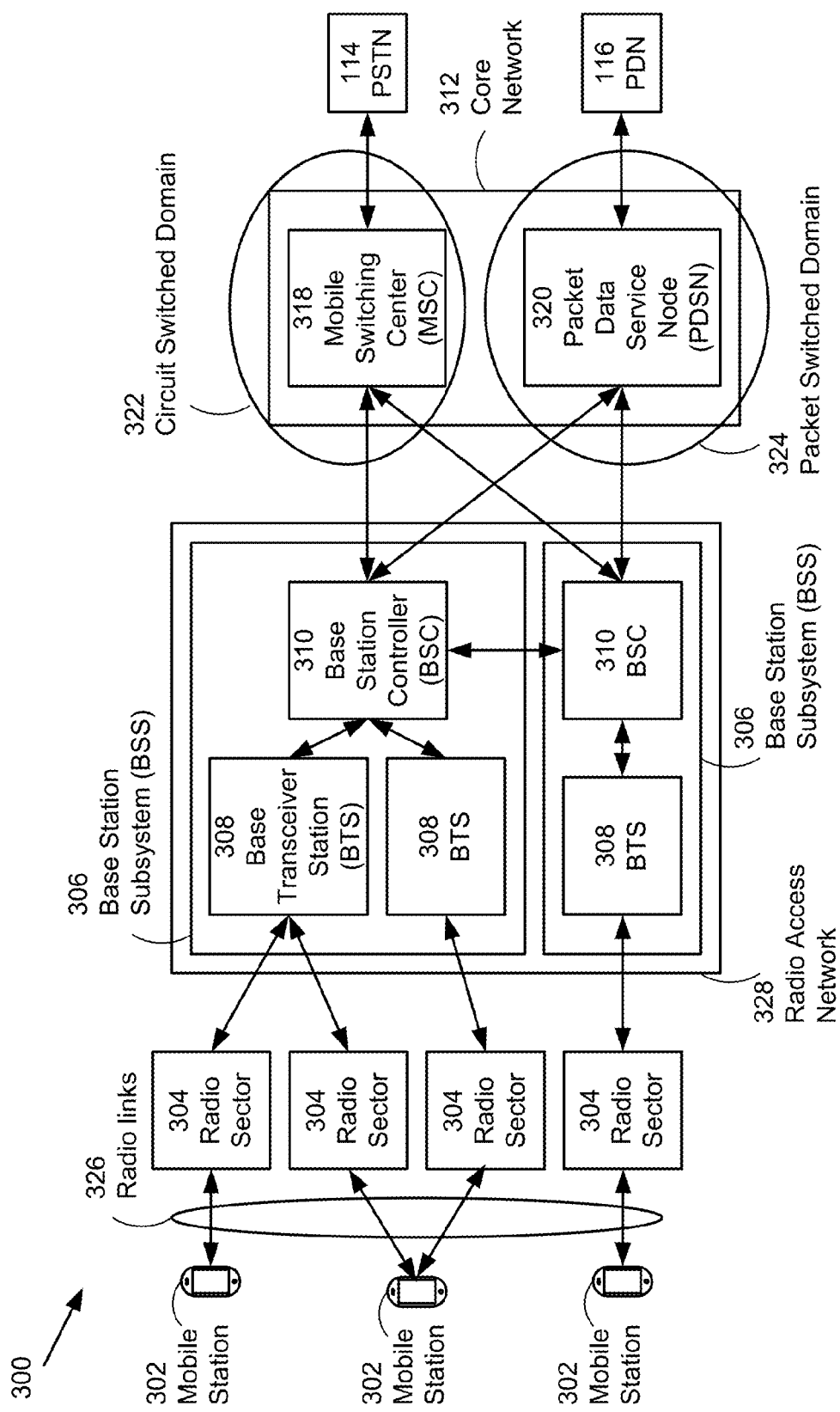
FIG. 3 illustrates components of a CDMA2000 1× wireless communication network.

FIG. 3 illustrates a representative CDMA2000 wireless network 300 that can include elements comparable to those described earlier for the generic wireless network 100 and the UMTS wireless network 200. Multiple mobile stations 302 can connect to one or more radio sectors 304 through radio frequency links 326. Each radio sector 304 can radiate outward from a base transceiver station (BTS) 308 that can connect to a base station controller (BSC) 310, together forming a base station subsystem (BSS) 306. Multiple base station subsystems 306 can be aggregated to form a radio access network 328. Base station controllers 310 in different base station subsystems 306 can be interconnected. The base station controllers 310 can connect to both a circuit switched domain 322 that use multiple mobile switching centers (MSC) 318 and a packet switched domain 324 formed with packet data service nodes (PDSN) 320, which together can form a core network 312 for the wireless network 300. As with the other wireless networks 100/200 described above, the circuit switched domain 322 of the core network 312 can interconnect to the PSTN 114, while the packet switched domain 324 of the core network 312 can interconnect to the PDN 116.

Figure 4:
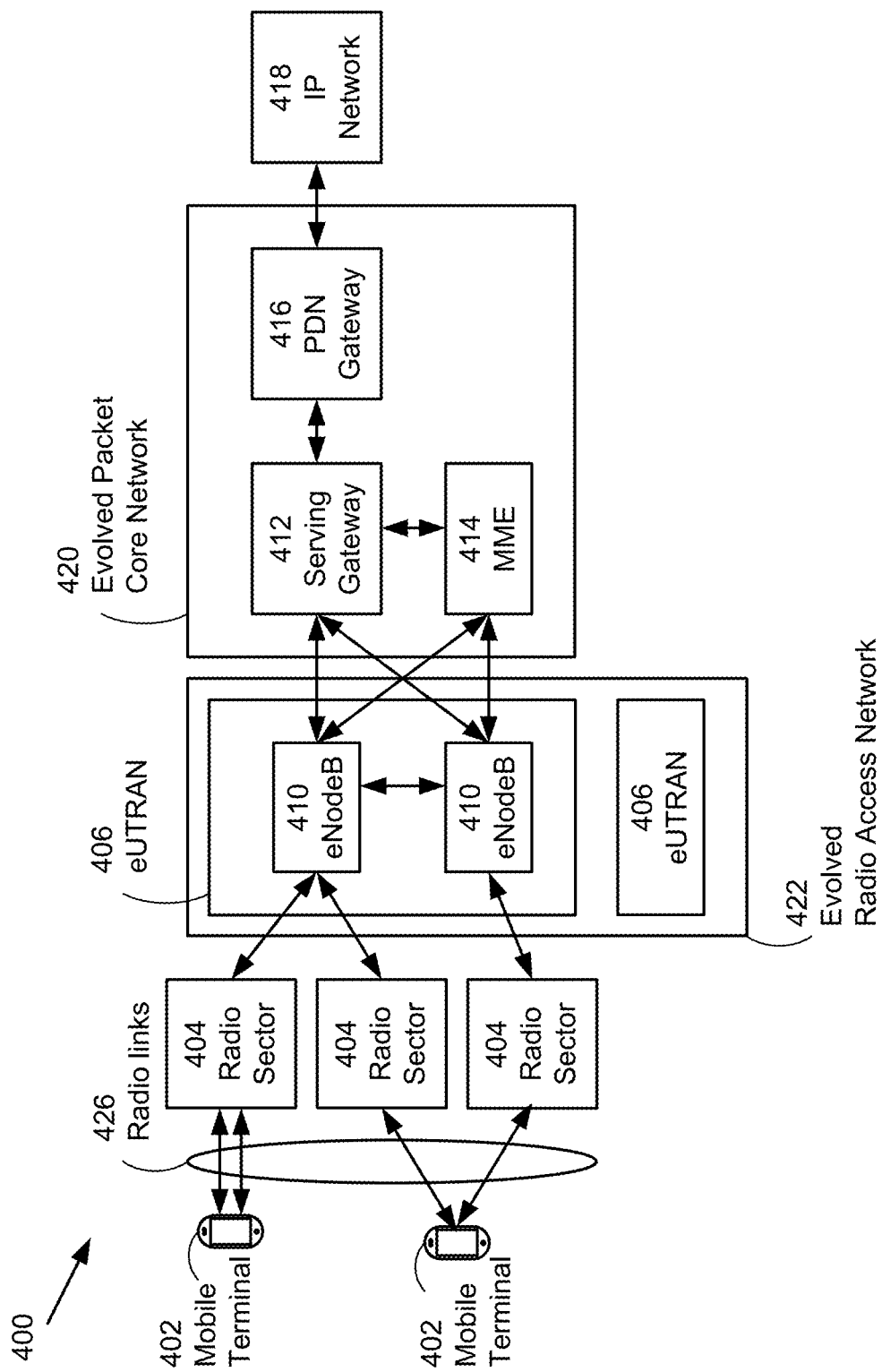
FIG. 4 illustrates components of a LTE wireless communication network.

FIG. 4 illustrates a representative Long Term Evolution (LTE) wireless network 400 architecture designed as a packet switched network exclusively. A mobile terminal 402 can connect to an evolved radio access network 422 through radio links 426 associated with radio sectors 404 that emanate from evolved Node B's (eNodeB) 410. The eNodeB 410 includes the functions of both the transmitting and receiving base stations (such as the Node B 206 in the UMTS network 200 and the BTS 308 in the CDMA2000 network 300) as well as the base station radio controllers (such as the RNC 212 in the UMTS network 200 and the BSC 310 in the CDMA2000 network 300). The equivalent core network of the LTE wireless network 400 is an evolved packet core network 420 including serving gateways 412 that interconnect the evolved radio access network 422 to public data network (PDN) gateways 416 that connect to external internet protocol (IP) networks 418. Multiple eNodeB 410 can be grouped together to form an evolved UTRAN (eUTRAN) 406. The eNodeB 410 can also be connected to a mobility management entity (MME) 414 that can provide control over connections for the mobile terminal 402.

Figure 5:
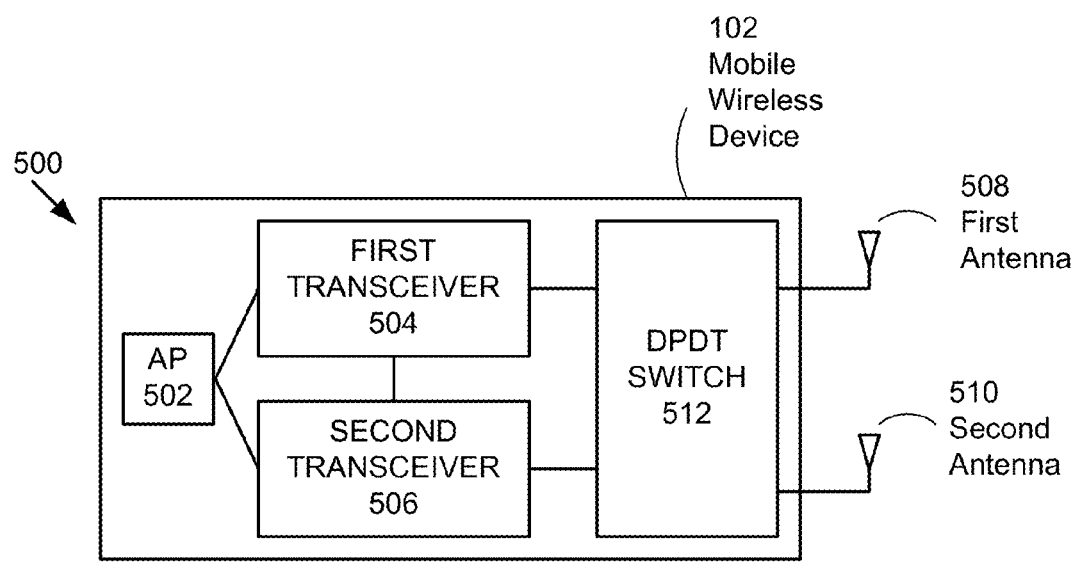
FIG. 5 illustrates a representative architecture for a mobile wireless communication device.

FIG. 5 illustrates select elements for an architecture 500 that can be used for a mobile wireless device 102. The mobile wireless device 102 can include a first transceiver 504 that can process signals according to a first wireless communication protocol and a second transceiver 506 that can process signals according to a second wireless communication protocol. The first and second wireless communication protocols can be identical or can be different. Circuitry for and capabilities of the first transceiver 504 and the second transceiver 506 can be identical or can be different. In a representative embodiment, the first transceiver 504 can transmit and receive wireless signals while the second transceiver can only receive but not transmit wireless signals. The first transceiver 504 can be interconnected to the second transceiver 506 to provide control information between them enabling coordinated transmission and reception to minimize interference. Both the first transceiver 504 and the second transceiver 506 can be connected to an application processor (AP) 502 that can provide higher layer functions, such requesting establishment and release of connections for various resident application services. Establishment of connections can include reception of signaling messages such as paging messages received through either of the transceivers 504/506 individually or through both transceivers 504/506 simultaneously. The transceivers 504/506 can provide lower layer functions such as reliable bit level transmission and reception that can support the communication of data messages for higher layer services controlled by the application processor 502.

The first transceiver 504 can be connected to a first antenna 508 or to a second antenna 510, and the second transceiver 506 can be connected similarly to the first antenna 508 or the second antenna 510 through a dual pole dual throw (DPDT) switch 512. The use of multiple antennas for wireless communication protocols can provide improved performance (e.g. higher data rates or better immunity to interference) compared to a single antenna configuration. One of the antennas can provide a stronger signal than the other antenna, or both antennas can be used to receive signals simultaneously in order to improve signal reception and decoding in the mobile wireless device 102. The DPDT switch can operate in one of two positions, either a "straight through" connection or a "crossed" configuration. Using the DPDT switch 512, either transceiver 504/506 can be connected to either antenna 508/510. Each transceiver 504/506 can be connected to a single antenna 508/510 at one time, and both transceivers 504/506 can be connected to separate antennas 508/510 and not be connected to the same antenna 508/510 simultaneously.

Figure 6:
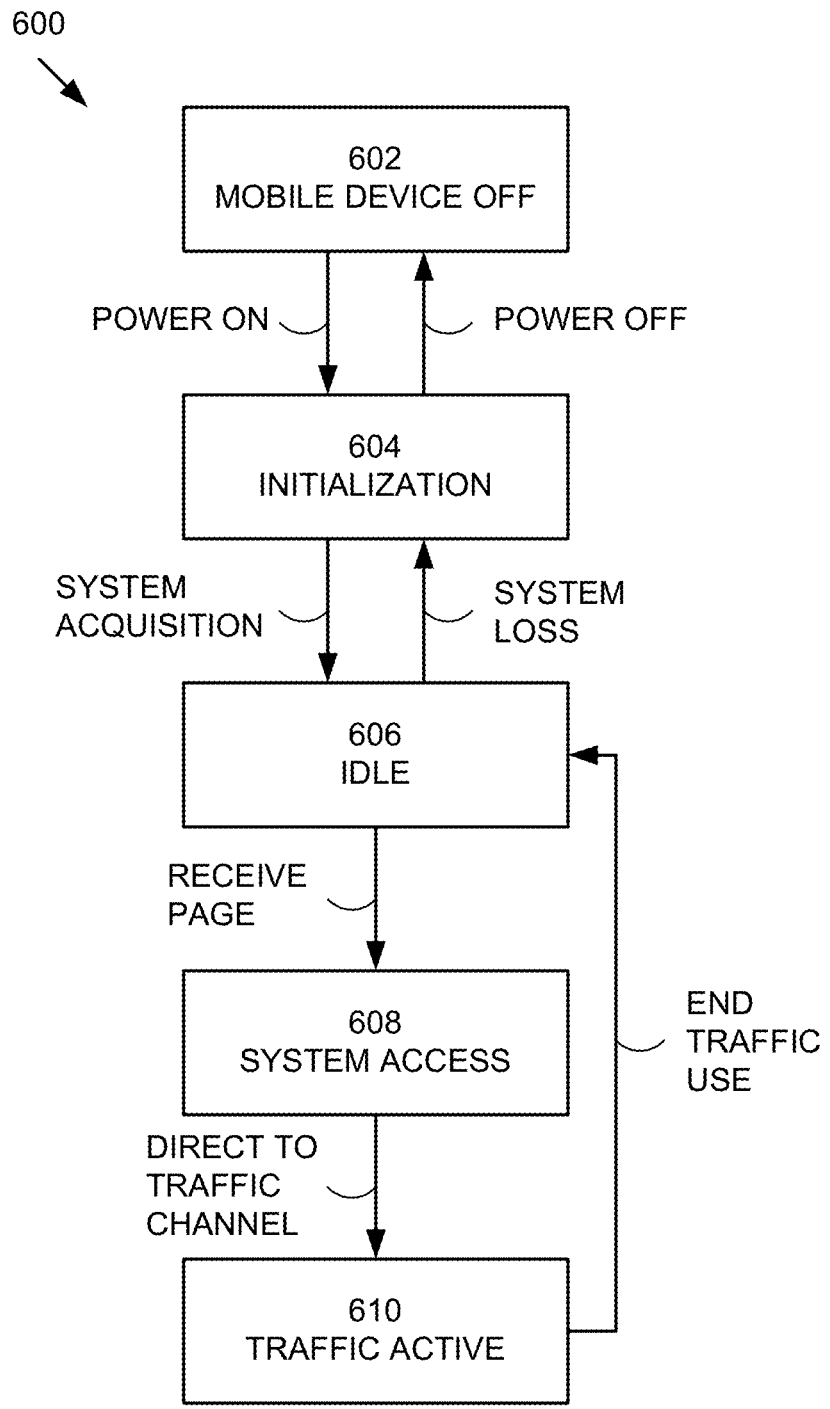
FIG. 6 illustrates a state transition diagram for a mobile wireless communication device in a wireless network.

FIG. 6 illustrates a high level state transition diagram 600 for the mobile wireless device 102 (and for the mobile station 302 operating in the CDMA2000 wireless network 300) when associating and connecting with the wireless network 100. The mobile wireless device 102 can initially be disconnected from the wireless network 100 and be in a powered off state 602. After powering on, the mobile wireless device 102 can enter an initialization state 604 during which the mobile wireless device 102 can locate one or more radio sectors 104 (or equivalently cells) in the wireless network 100 with which the mobile wireless device 102 can associate and connect. The mobile wireless device 102 can know a frequency band in which to receive transmissions and can identify radio sectors 104 by searching for physical channels, such as pilot signals, broadcast by the wireless network 100. The mobile wireless device 102 can register with the wireless network 100 to indicate its presence and thereby alert the wireless network 100 to its availability to initiate and to receive (terminate) connections.

After acquiring the wireless network 100, the mobile wireless device 102 can enter an "idle" state 606. For wireless networks 100 that support power saving modes, the idle state 606 can include periods of time in which portions of the mobile wireless device 102 can be powered down. The mobile wireless device 102 can be powered up during appropriate time intervals known to wireless network 100 in which to receive a page message from the wireless network. The page messages can include information broadcast to multiple mobile wireless devices 102 in the wireless network as well as specific messages intended for the particular mobile wireless device 102. After receiving a page message, the mobile wireless device 102 can enter a system access state 608 during which it can establish radio resources with the wireless network 100 over which to communicate traffic (voice/video/data/messages) with the wireless network 100 in a traffic active state 610. The active connection can subsequently be disconnected by the mobile wireless device 102 or the wireless network 100 and the mobile wireless device 102 can return from the traffic active state 610 to the idle state 606 to await pages for a future connection.

Figure 7:
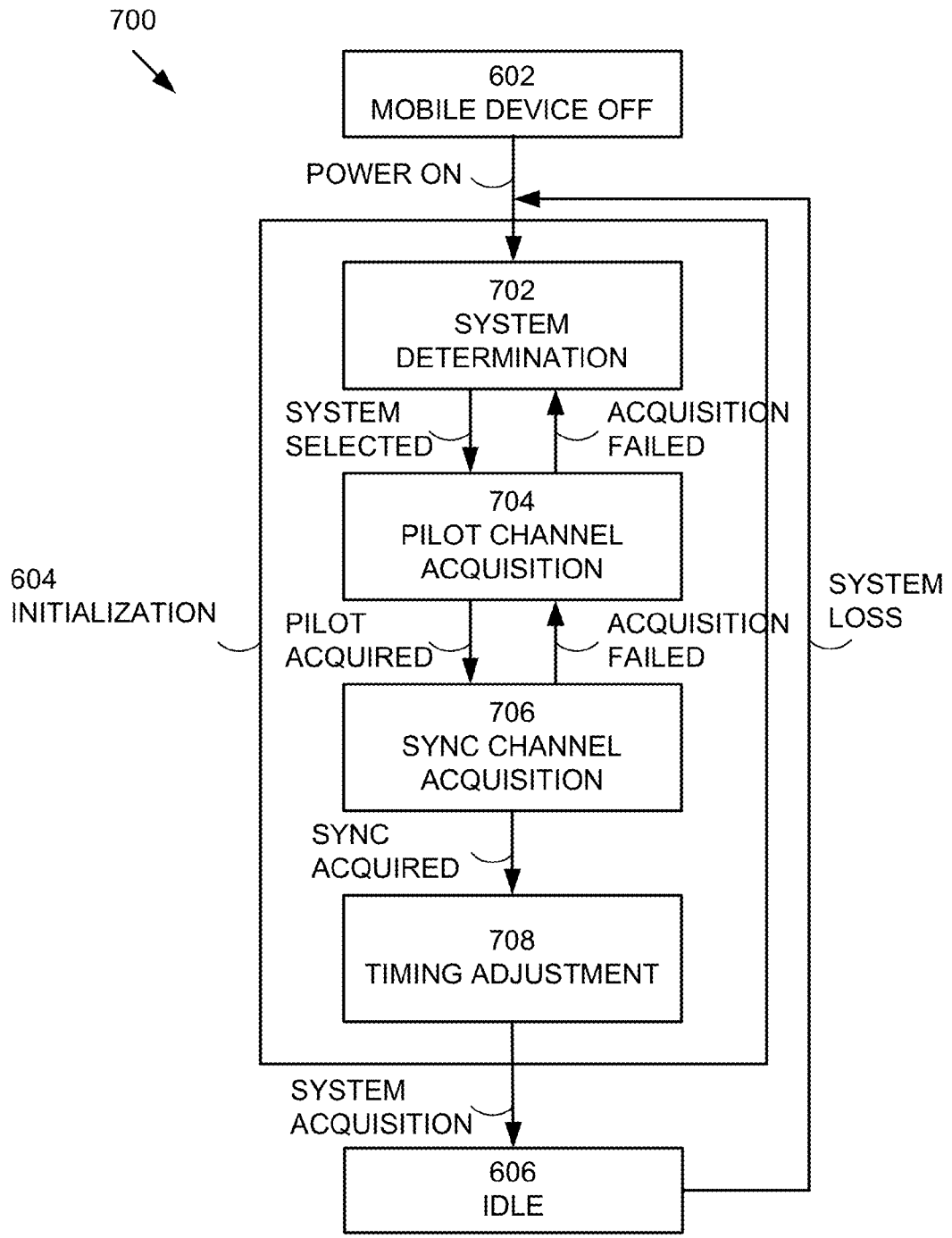
FIG. 7 illustrates a state transition diagram for a mobile wireless communication device during system acquisition of a wireless network.
Figure 8:
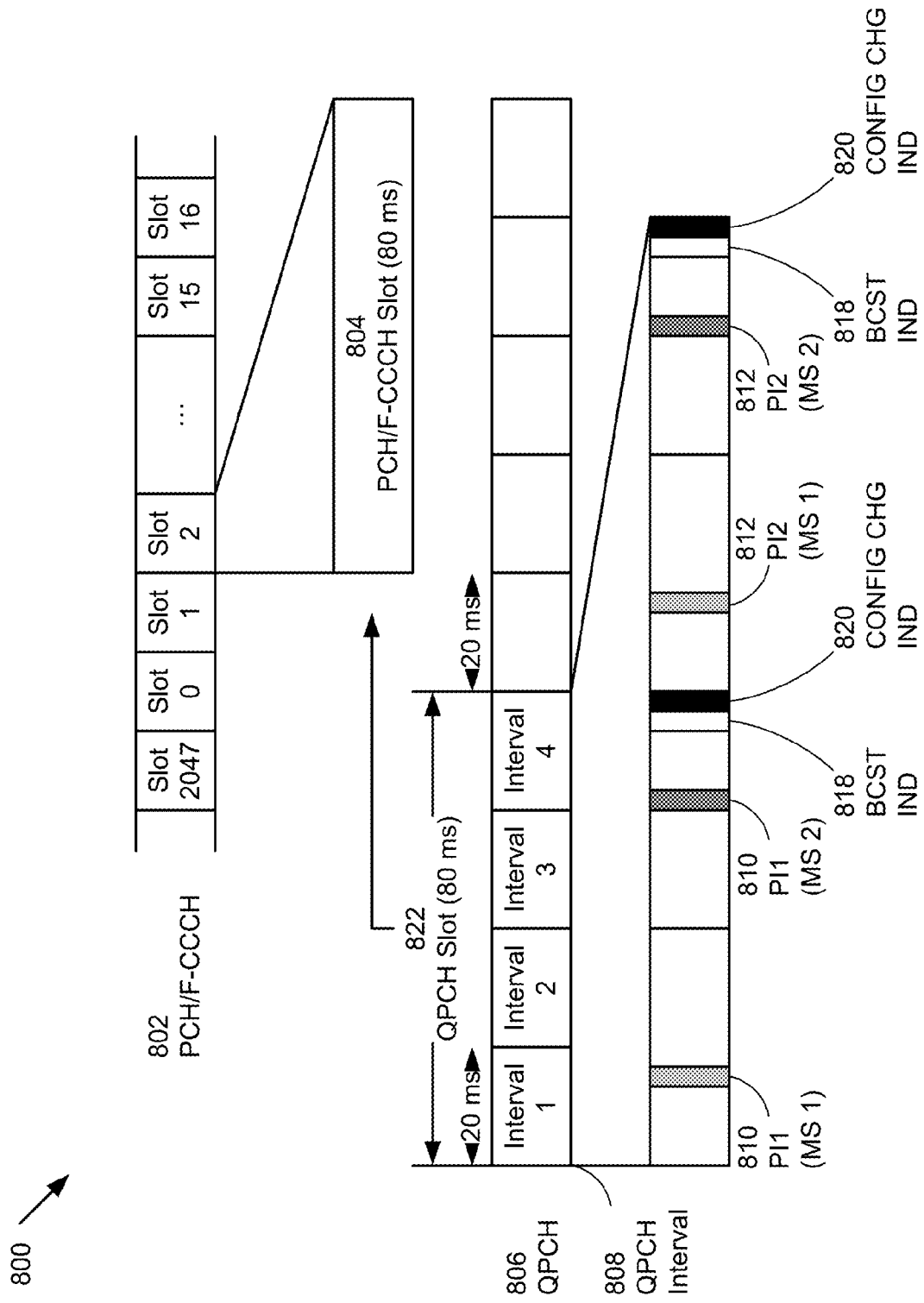
FIG. 8 illustrates a paging indicator channel and a paging/control channel for a CDMA2000 1× wireless network.

FIG. 7 illustrates a set 700 of sub-states through which the mobile wireless device 102 can traverse when executing the initialization state 604 of FIG. 6. After power up from the power off state 602, the mobile wireless device 102 can enter the system determination sub-state 702. In the system determination sub-state 702, the mobile wireless device 102 can select a wireless network 100 as a wireless system to use. Following the selection of the wireless network 100 system, the mobile wireless device 102 can acquire the selected wireless network 100 system by searching for and acquiring a pilot channel in the pilot channel acquisition sub-state 704. Once the pilot channel is acquired, the mobile wireless device 102 can enter a sync channel acquisition sub-state 704. If no pilot channel is acquired by the mobile wireless device 102 within a pre-determined period of time while in the pilot channel acquisition sub-state 704, the mobile wireless device 102 can return to the system determination sub-state 702 indicating a pilot acquisition failure. Following successful pilot acquisition, the mobile wireless device 102 can obtain system configuration and timing information from the wireless network 100 in the sync channel acquisition sub-state 704. Once sync channel acquisition is complete, the mobile wireless device 102 can enter the timing adjustment sub-state 708 and can synchronize timing in the mobile wireless device 102 with the selected wireless network 100. When system acquisition is complete, the mobile wireless device 102 can enter the idle state 606 and can monitor one or more signaling channels for signaling messages sent by the wireless network 100. In a representative CDMA2000 wireless network embodiment, the mobile station 302 in the idle state 606 can monitor one or more channels that can include a paging channel (PCH), a quick paging channel (QPCH), a forward common control channel (F-CCCH) and a primary broadcast control channel (PBCH). The mobile station 302 can monitor the quick paging channel for page indicators that can determine when the mobile station 302 should listen to a parallel paging channel or forward common control channel for signaling messages. By listening to the quick paging channel during limited short time intervals only, the mobile station 302 can conserve power in the idle state 606 by powering down select internal components, such as analog receive circuitry, when not listening to the quick paging channel FIG. 8 illustrates a representative slotted mode 800 transmission scheme for the mobile station 302 operating in the CDMA2000 1× wireless network 300. Transmissions on a paging channel (F-PCH) or a forward common control channel (F-CCCH) can be divided into a series of equal duration time slots 804. Each PCH/F-CCCH slot 804 can extend for 80 ms, and a series of 2048 successive PCH/F-CCCH slots 804 can span a maximum slot cycle length of 2048×80 ms=163.84 seconds. The mobile station 302 can determine a slot number in the integer range from 0 to 2047 based on a pre-determined algorithm and can also determine a slot cycle length equal to T multiples of 1.28 seconds where $T=2^i$, and the integer i is a slot cycle index taken from a set of the integer values, e.g. {0, 1, 2, 3, 4, 5, 6, 7}. For example, with a slot cycle index i=0, the mobile station 302 can be assigned slots 804 spaced 1 multiple of 1.28 s=16×80 ms time slots apart. With a slot cycle index i=2, the mobile station 302 can be assigned slots 804 spaced $2^2$=4 multiples of 1.28 s=64×80 ms time slots apart. When operating in a slotted mode in an idle state, the mobile station 302 can listen to the assigned PCH/F-CCCH time slots 804 and can sleep during the intervening PCH/F-CCCH time slots 804 to conserve battery power. As an assigned PCH/F-CCCH time slot 804 can be assigned to multiple mobile stations 302 in the wireless network 300, the wireless network 300 can also transmit indicators on a quick paging channel (QPCH) 806 parallel to the paging channel The indicators on the QPCH 806 channel can communicate to individual mobile stations 302 about the availability of a forthcoming message on the parallel PCH/F-CCCH 802 channel.

As shown in FIG. 8, the QPCH 806 channel can be divided into successive 80 ms QPCH slots 822 (each QPCH slot 822 having the same length as a corresponding PCH/F-CCCH slot 804), and each QPCH slot 822 can be divided into four contiguous 20 ms time intervals 808. Indicators communicated in a QPCH slot 822 on the QPCH 806 channel can alert the mobile station 302 of the availability of signaling messages intended for the mobile station 302 in a subsequent PCH/F-CCCH slot 804 on the PCH/F-CCCH 802 channel In a representative embodiment, the indicator transmitted in the QPCH slot 822 can be a single bit, which can be repeated in two separate non-contiguous time intervals 808 of the QPCH slot 822. The mobile station 302 can monitor paging indicators in the assigned quick paging channel slots 822, which can be offset in advance of the associated PCH/F-CCCH slot 804. Two paging indicators can be transmitted in either QPCH intervals 1 and 3 or in QPCH intervals 2 and 4 of the QPCH slot 822. A first QPCH page indicator PI1 810 for a first mobile station 302 (MS 1) can be transmitted in QPCH interval 1 and repeated as a second page indicator PI2 812 for the first mobile station 302 (MS 1) in QPCH interval 3. Similarly a first QPCH page indicator PI1 810 for a second mobile station 302 (MS 2) can be transmitted in QPCH interval 2 and repeated as a second page indicator PI2 812 for the second mobile station 302 (MS 2) in QPCH interval 4. The wireless network 300 can also transmit broadcast indicators (BCST IND) 818 and configuration change indicators (CONFIG CHG IND) 820 in the QPCH slot 822. The broadcast and configuration change indicators can be directed to all mobile stations 302 currently associated with a radio sector 304 in the wireless network 300.

Figure 9:
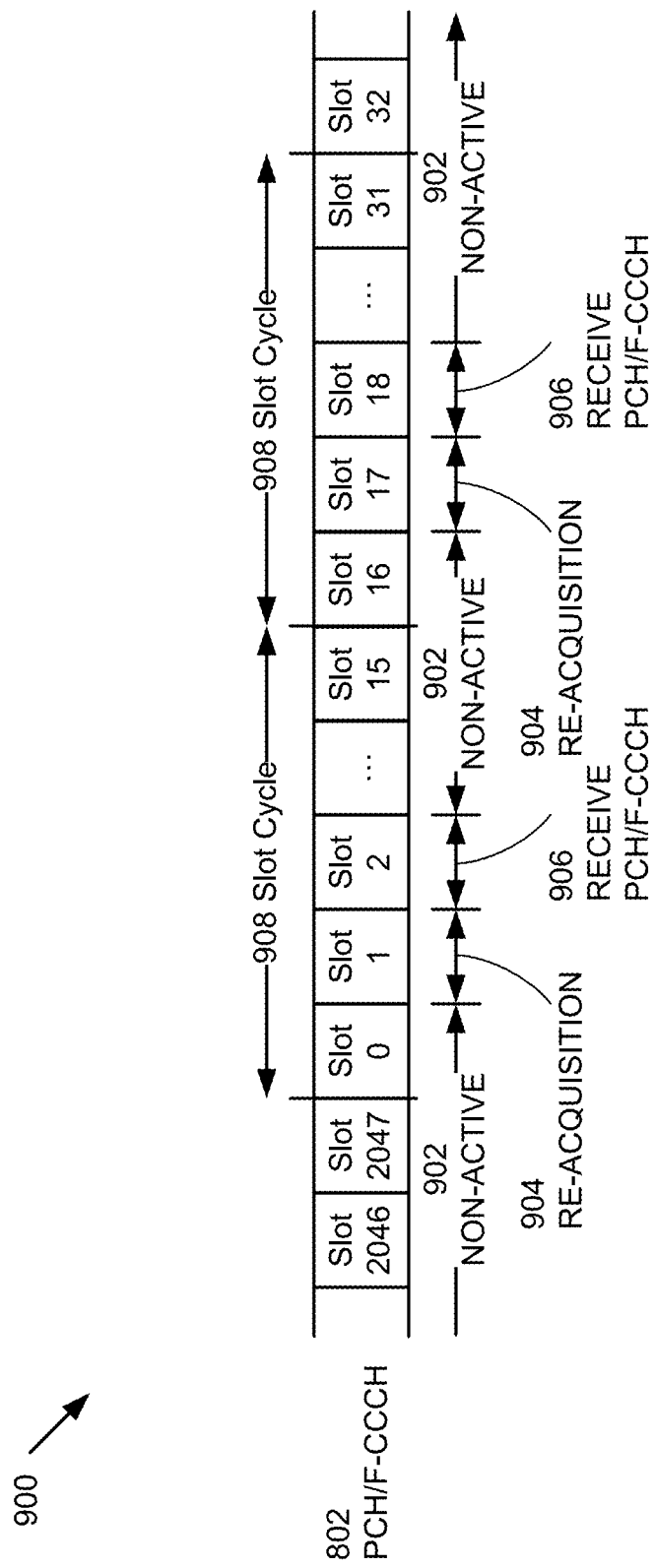
FIG. 9 illustrates a slotted mode discontinuous reception cycle for a mobile wireless device receiving a paging/control channel in a CDMA2000 1× wireless network.

The mobile station 302 can monitor the paging indicators 810/812 in an assigned QPCH slot 822 of the QPCH channel 806, and when the mobile station 302 detects an "OFF" paging indicator bit value, the mobile station 302 can forgo monitoring the associated PCH/F-CCCH slot 804 of the PCH/F-CCCH 802 channel. When the mobile station 302 detects an "ON" paging indicator bit value in both the first paging indicator bit 810 and in the second paging indicator bit 812, the mobile station 302 can monitor the associated PCH/F-CCCH slot 804 of the PCH/F-CCCH 802 channel for a paging (control/signaling) message. When the mobile station 302 detects an "ERASURE" paging indicator bit value (i.e. neither an unequivocal "ON" or unequivocal "OFF"), the mobile station 302 can monitor the associated PCH/F-CCCH slot 804 on the PCH/F-CCCH 802 channel, as the paging indicator bit value detected can be equivocal, neither indicating a presence nor indicating an absence of a signaling message on the immediately following PCH/F-CCCH slot 804 on the PCH/F-CCCH 802 channel Monitoring paging indicator bits 810/812 on the QPCH channel 806 can conserve battery power, as the mobile station 302 can avoid monitoring the PCH/F-CCCH channel 802 when no intended signaling message exists. Monitoring for one or two bits on the QPCH channel 806 can consume less processing power than monitoring for an entire signaling message on the PCH/F-CCCH 802 channel FIG. 9 illustrates a slotted mode 900 of operation for a mobile station 302 on a PCH/F-CCCH 802 channel with a slot cycle 908 of 16 consecutive time slots. In a representative example as show, the mobile station 302 can be assigned the time slots numbered 2/18/34/ . . . in successive slot cycles 908. When not monitoring the PCH/F-CCCH 802 channel directly, the mobile station 302 can "sleep" for most slots and "awaken" to reacquire the wireless network 300 to monitor the assigned slot in the slot cycle 908. The mobile station 302 can be in a non-active state 902 outside of the assigned and immediate preceding PCH/F-CCCH 802 channel slots. For example, during slot 1, the mobile station 302 can awaken from a sleep state and can re-acquire the wireless network 300 prior to monitoring for and receiving a signaling message during slot 2 of the PCH/F-CCCH channel 802. After receiving signals during the assigned slot, the mobile station 302 can return to the non-active state 902 and can later repeat the re-acquisition and reception for the assigned slot in each successive slot cycle 908 on the PCH/F-CCCH 802 channel When monitoring an associated QPCH channel 806 (not shown), the mobile station 302 can sleep, re-acquire and receive indicator bits on the QPCH channel 806 in a similar manner to the slotted cyclic mode depicted in FIG. 9 for the PCH/F-CCCH 802 channel. When received paging indicator bits so indicate, the mobile station 302 can receive signaling messages in the associated time slot on the PCH/F-CCCH channel 802. (When the indicator bits are inconclusive, the mobile station 302 can also monitor the time slot in the PCH/F-CCCH channel 802 so as to not miss inadvertently an intended paging message.) When the indicator bits received on the QPCH channel 806 indicate no message on the PCH channel, then the mobile station 302 can avoid reading the PCH channel and can sleep in the non-active state 902 until the next slot cycle 908.

Figure 10A:
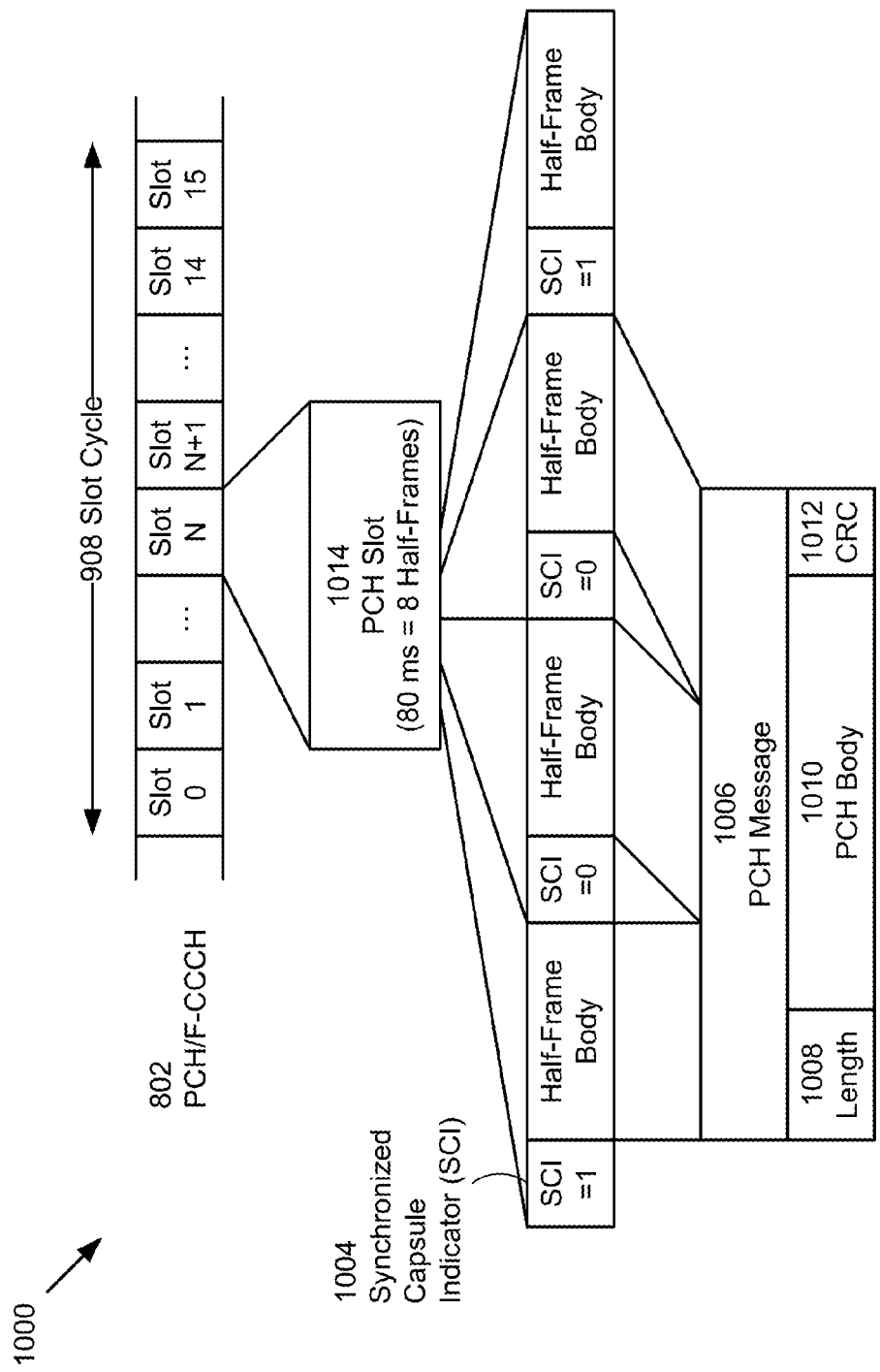
FIG. 10A illustrates a format for paging messages on a paging channel in a CDMA2000 1× wireless network.

FIG. 10A illustrates a format 1000 for transmitting a layer 2 signaling PCH message 1006 in a PCH slot 1014 on the PCH/F-CCCH channel 802. The layer 2 signaling PCH message 1006 can also be referred to as a layer 2 encapsulated protocol data unit (PDU). The PCH slot 1014 can include eight half-frames, each half-frame occupying 10 ms of the 80 ms PCH time slot 1014. Each half-frame can include a synchronized capsule indicator (SCI) bit 1004, which can indicate the start (SCI=1) or continuation (SCI=0) of the PCH message 1006, followed by a half-frame body. Multiple half-frame bodies from separate half-frames can be assembled together to form a single PCH message 1006. Within a single PCH time slot 1014, multiple PCH messages 1006 can be contained. The PCH message 1006 can be formatted as shown in FIG. 10A to include a length segment 1008, a body segment 1010 and a layer 2 cyclic redundancy check (CRC) segment 1012. The length segment 1008 can indicate the number of bits/bytes in the PCH message 1006, while the CRC segment 1012 can provide an error checking capability. The mobile station 302 can calculate a CRC based on the received PCH body 1010 and can compare the calculated CRC to the received CRC segment 1012. The calculated CRC can match the received CRC segment 1012, which can be considered a "correctly" received CRC, i.e. a CRC "Pass" determination, or can differ from the received CRC segment 1012, which can be considered an "incorrectly" received CRC, i.e. a CRC "Fail" determination. An "incorrectly" received CRC "Fail" determination can indicate that one or more bit errors can exist in the received PCH body 1010 and thus the received and decoded PCH message 1006 can be considered unreliable.

Figure 10B:
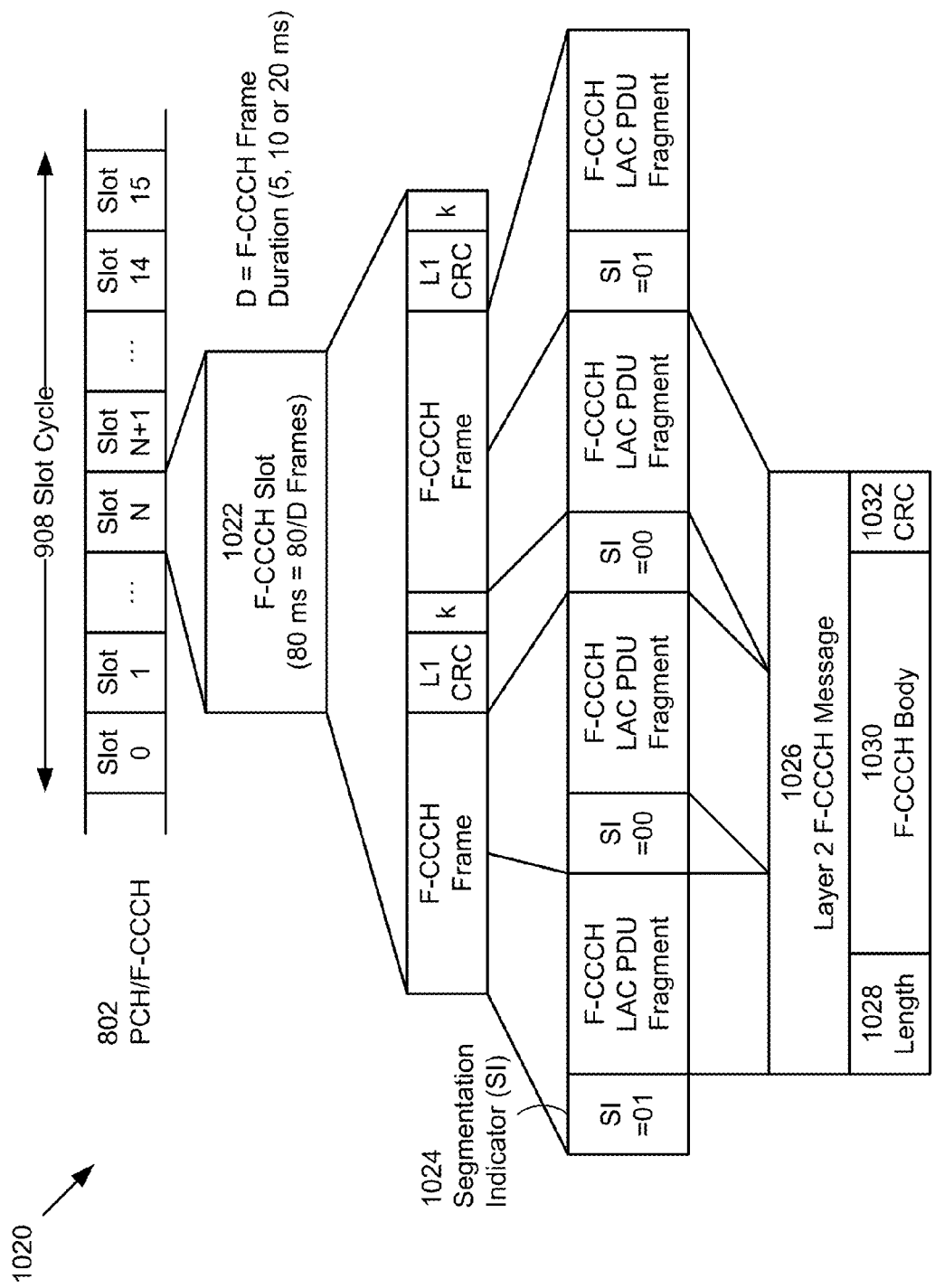
FIG. 10B illustrates a format for control messages on a control channel in a CDMA2000 1× wireless network.

FIG. 10B illustrates a format 1020 for transmitting a layer 2 signaling F-CCCH message 1026 in an F-CCCH slot 1022 on the PCH/F-CCCH channel 802. The layer 2 F-CCCH message 1026 resembles the layer 2 PCH message 1006 having a length segment 1028, an F-CCCH body 1030 and a layer 2 CRC segment 1032. The mobile station 302 can compare a calculated CRC to a received layer 2 CRC segment 1032 for the layer 2 F-CCCH message 1026 in the same manner as described for the PCH message 1006. The layer 2 F-CCCH message 1026 can be segmented into a set of F-CCCH link access control (LAC) protocol data unit (PDU) fragments. A segmentation indicator (SI) 1024 can be appended to each F-CCCH LAC PDU fragment and several fragments can form a layer 1 F-CCCH frame. The layer 1 F-CCCH frame can be appended with an additional layer 1 CRC along with "k" tail bits for transmission in the F-CCCH slot 1022. Each F-CCCH frame can have a duration of 5, 10 or 20 ms, and multiple F-CCCH frames can fit within an F-CCCH slot 1022 that can span 80 ms.

When the mobile station 302 operates in a slotted mode in the wireless network 300 with the QPCH 806 channel, the mobile station 302 can determine use of signals received from one or more antennas and receivers in the mobile station 302 based on observed decoding results for the QPCH paging indicator bits 810/812. The mobile station 302 can select from which multiple antennas to receive signals as well as determine whether to receive signals through both antennas simultaneously based on measured values for the QPCH PI1 and PI2 bits 810/812. In addition, the mobile station 302 can use other measured performance indicators, such as measured received signal strength and/or received signal quality to influence the number and selection of antennas and receivers to use as will be discussed further below.

Figure 11:
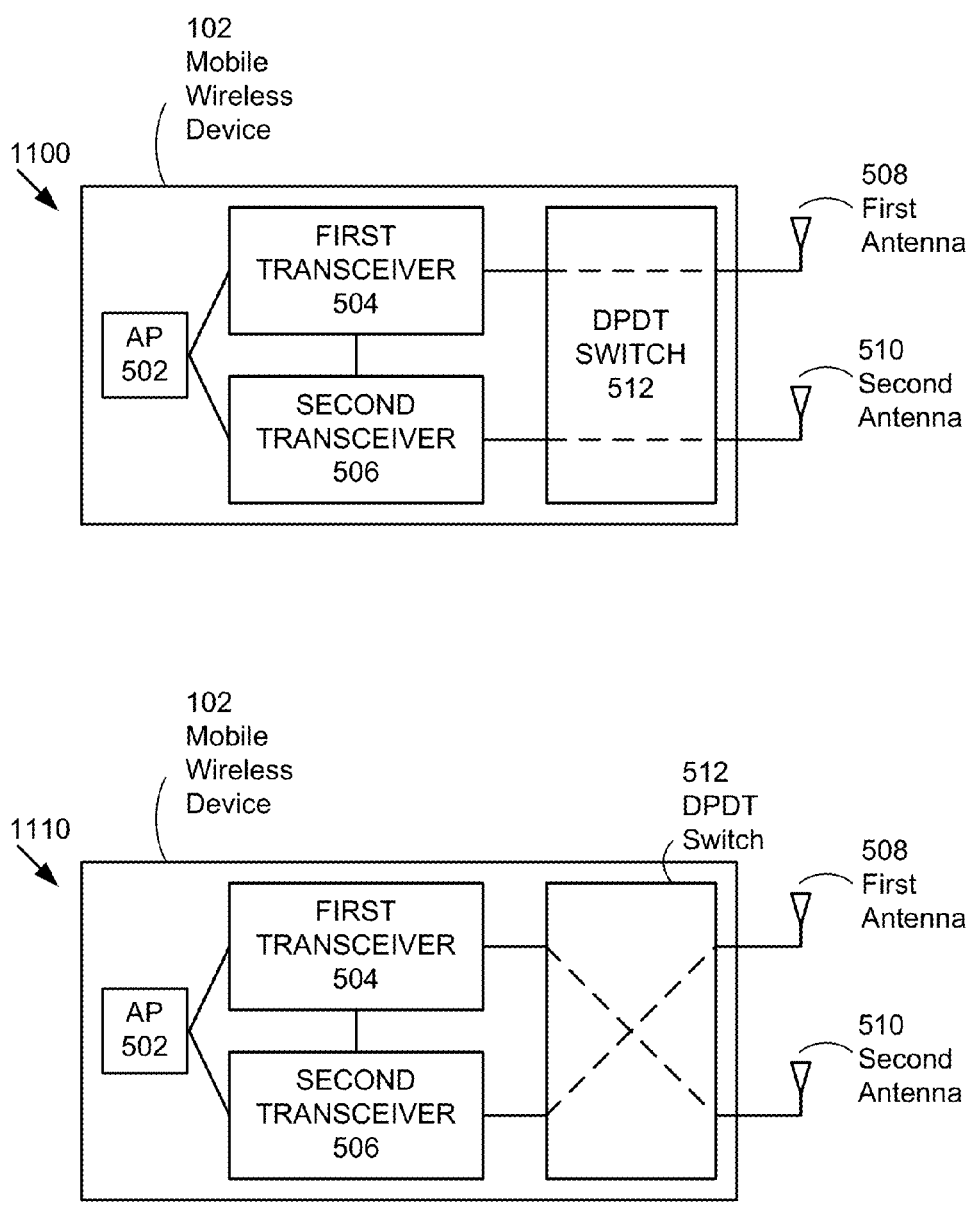
FIG. 11 illustrates two configurations for a dual pole dual throw switch in a mobile wireless device that supports receive diversity.
Figure 12:
FIG. 12 summarizes page/control channel actions for a mobile wireless device based on decoded page indicator values.

FIG. 11 illustrates two different configurations 1100/1110 for connections between the multiple antennas 508/510 and the multiple transceivers 504/506 for the mobile wireless device 102 (or the mobile station 302). The DPDT switch 512 can connect the first antenna 508 and the second antenna 510 in a "straight through" configuration 1000 to the first transceiver 504 and the second transceiver 506 respectively. In addition, the DPDT switch 512 can connect the first antenna 508 and the second antenna 510 in a "crossed" configuration 1110 to the second transceiver 506 and the first transceiver 504 respectively. When the first and second transceivers 504/506 can both support the same communications protocol, the mobile wireless device 102 can be configured to receive signals in either configuration. When operating in a single transceiver mode, such as by powering up the first transceiver 504 and by powering down the second transceiver 506, the DPDT switch 512 can be positioned to receive signals at the first transceiver 504 from either the first antenna 508 in the "straight through" configuration 1000 or the second antenna 510 in the "crossed" configuration 1110. One configuration can be chosen over the other configuration based on an instantaneous or an averaged performance measure, e.g. a signal quality measure, a signal strength measure, a decoded bit quality measure or other similar performance measure. In one embodiment, decoded bit values received on the QPCH 806 channel can be used to determine which DPDT switch 512 configuration 1100 or 1110 can be used for decoding the QPCH 806 channel bit and also for receiving and decoding the associated PCH/F-CCCH 802 channel FIG. 12 illustrates a table 1200 of actions that can be taken by the mobile wireless device 102 for a PCH/F-CCCH 804 time slot of the PCH/F-CCCH 802 channel 102 based on decoded values of one or two associated paging indicator bits 810/812 received on the QPCH 806 channel The mobile wireless device 102 can awaken from a sleep state and read the paging indicator bits on the QPCH 806 channel in order to determine whether to read a corresponding PCH/F-CCCH time slot 804 of the PCH/F-CCCH 802 channel When the first paging indicator bit PI1 810 decodes to an "OFF" value (e.g. bit value=0), the mobile wireless device 102 can determine that no signaling message exists on the PCH/F-CCCH 802 channel to which the mobile wireless device 102 should listen. This conclusion can be made by the mobile wireless device 102 irrespective of a value read on the paging indicator channel PI2 812. In an embodiment, when the first page indicator PI1 equals the "OFF" zero value, the mobile wireless device 102 can avoid reading the second page indicator PI2 to conserve additional battery power. The mobile wireless device 102 can return to a sleep state to conserve battery power without monitoring the second page indicator PI2 or the PCH/F-CCCH 802 channel. The mobile wireless device 102 can then re-awaken in the appropriate time slot of the next slot cycle to read the next received set of page indicator bits PI1 810 and PI2 812 on the QPCH 806 channel When the first page indicator PI1 810 equals an "ON" value (e.g. bit value=1), the mobile wireless device 102 can read the second page indicator PI2 812 in addition to the first page indicator PI1 810 to determine a subsequent action. When the first page indicator PI1 810 equals an "ON" value and the second page indicator PI2 812 indicates an "OFF" value, the mobile wireless device 102 can conclude that no message exists on the PCH/F-CCCH 802 channel and sleep until the next slot cycle. Thus, when receiving an unequivocal "OFF" value in either the first page indicator PI1 810 or in the second page indicator PI2 812, the mobile wireless device 102 can return to sleep to conserve battery power and not read the associated PCH/F-CCCH channel 802. When both the first page indicator PI1 810 and the second PI2 812 page indicator decode to an "ON" value, the mobile wireless device 102 can receive and decode a signaling message (e.g. a paging message) on a corresponding PCH/F-CCCH time slot 804 of the PCH/F-CCCH channel 802. The mobile wireless device 102 can use the same initial antenna to read the PCH/F-CCCH channel 802 as used to read the page indicators PI1/PI2 810/812 when both page indicator bits are "ON". When at least one of the page indicator bits is an equivocal "ERASURE" value, the mobile wireless device 102 can take one of several different actions to resolve the uncertainty.

For a mobile wireless device 102 with a DPDT switch 512, the first page indicator bit PI1 810 can be decoded using an initial antenna. Depending on the initial configuration of the DPDT switch 512 the initial antenna can be either the first antenna 508 or the second antenna 510. In a representative embodiment, a default configuration for the DPDT switch 512 can be the "straight through" configuration 1100, and the first antenna 508 can be considered a primary antenna through which signals are normally received, while the second antenna 510 can be considered a secondary antenna through which signals are received when warranted by a measured signal strength/quality and/or based on page indicator bit decode values. As indicated in the Table 1200 of FIG. 12, after decoding an "ON" bit value for both the first page indicator PI1 810 and the second page indicator PI2 812 received through the initial antenna, the mobile wireless device 102 can decode the parallel subsequent accompanying PCH/F-CCCH 802 channel also using the initial antenna. Similarly when the first page indicator PI1 810 decodes to an "ON" bit while the second page indicator PI2 812 decodes to an "Erasure" value, the mobile wireless device 102 can continue to use the initial antenna to receive and decode the PCH/F-CCCH 802 channel as there is no strong indication (i.e. no "OFF" received) that no message exists on the PCH/F-CCCH 802 channel.

When the first page indicator bit 810 decodes to an "Erasure" value (i.e. neither clearly an "ON" or "OFF" value), the mobile wireless device can use the DPDT switch 512 to receive signals selectively from the first or second antennas 508/510 when decoding the second page indicator bit PI2 812 and the subsequent PCH/F-CCCH 802 channel. In particular, when the first page indicator bit PI1 810 received through an initial antenna decodes to an "Erasure", the mobile wireless device 102 can toggle the DPDT switch 512 to read the second page indicator bit PI2 812 through an alternate antenna. For example, the initial antenna can be the first antenna 508 connected to the first transceiver 504 with the DPDT switch in the "straight through" configuration 1100, and decoding of the first page indicator bit PI1 810 as an "Erasure" can indicate poor signal quality received through the first antenna 508. The mobile wireless device 102 can change the configuration of the DPDT switch 512 to the "crossed" configuration 1110 thereby connecting the second antenna 510 to the first transceiver 504. Signals received through the second antenna 510 can be of higher quality than signals received through the first antenna 508. The mobile wireless device 102 can then decode the second page indicator bit PI2 812 using the first transceiver 504 connected to the second antenna 510 as an alternate antenna.

When the mobile wireless device 102 decodes the second page indicator bit PI2 812 as an "OFF" value indicating no signaling message forthcoming, the mobile wireless device 102 can perform no decoding of the subsequent PCH/F-CCCH 802 channel When the mobile wireless device 102 decodes the first page indicator bit PI1 810 as an "Erasure" value and the second page indicator bit PI2 812 as an "ON" value, the mobile wireless device 102 can decode the PCH/F-CCCH 802 channel using the alternate antenna, i.e. the same antenna as used to decode the second page indicator bit PI2 812 rather than through the initial antenna used to decode the first page indicator bit PI1 810. The unequivocal "ON" value received through the alternate antenna can indicate a better received signal than the equivocal "Erasure" value received through the initial antenna. When the mobile wireless device 102 decodes both the first page indicator bit PI1 810 as an "Erasure" through the initial antenna and the second page indicator bit PI2 812 also as an "Erasure" through the alternate antenna, the mobile wireless device 102 can toggle the DPDT switch 512 back to the initial antenna and subsequently decode the PCH/F-CCCH 802 channel using signals received through the initial antenna. The pair of "Erasure" values for the page indicator bits PI1 810 and PI2 812 can provide no definite indication of the presence or absence of a signaling message on the PCH/F-CCCH 802 channel To avoid missing a signaling message that can exist on the PCH/F-CCCH 802 channel, the mobile wireless device 102 can attempt a decode of the PCH/F-CCCH 802 channel through the initial antenna (neither antenna providing a distinct measureable advantage based on the received page indicator bits PI1/PI2 810/812).

Figure 13A:
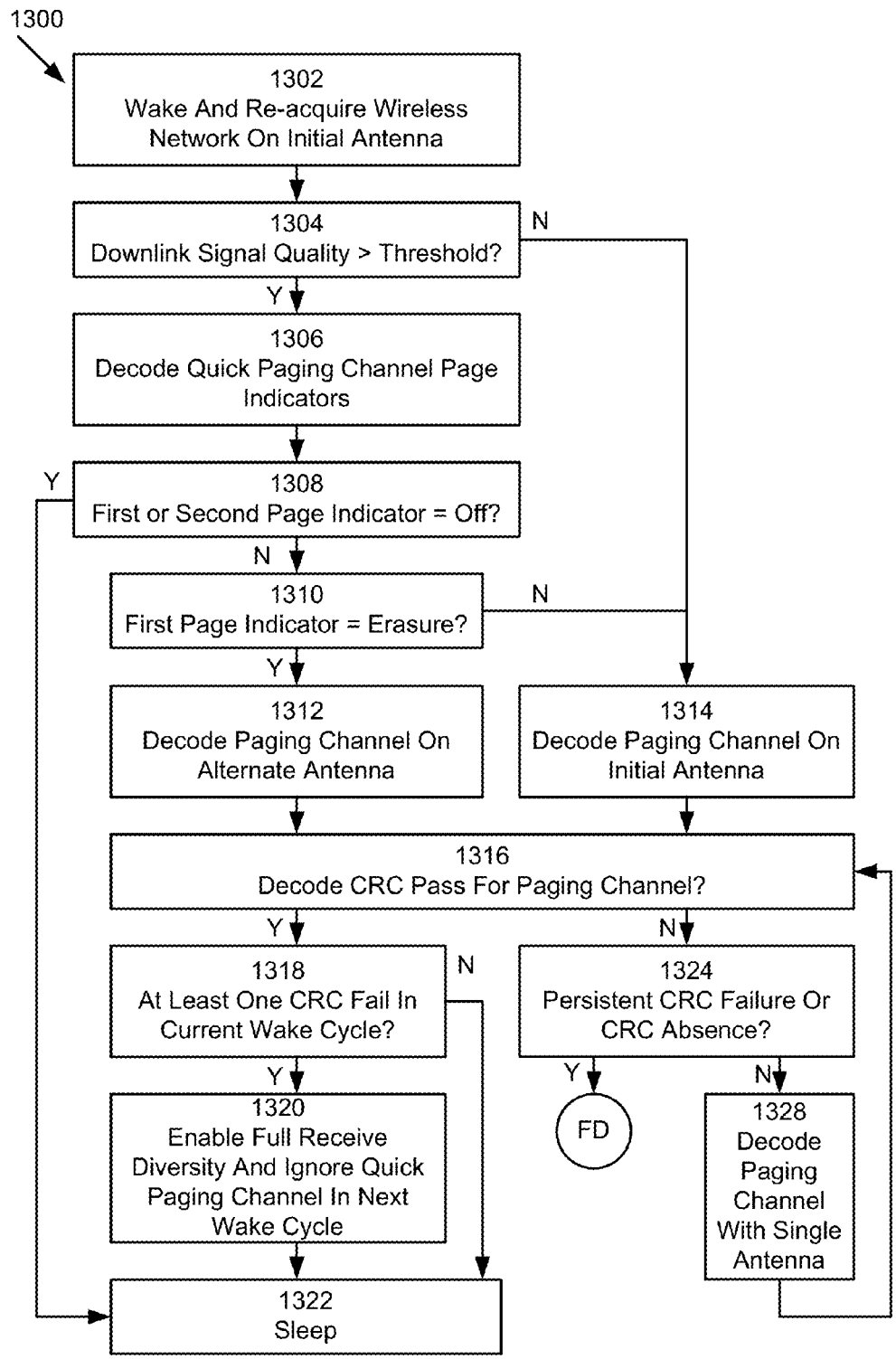
FIGS. 13A and 13B illustrate a representative method for adapting receive diversity for a mobile wireless device in a CDMA2000 1× wireless network.

FIG. 13A illustrates a representative embodiment of a method 1300 to enable receive diversity in the mobile wireless device 102 during a discontinuous reception (DRX) slot cycle based on measured values for quick paging channel page indicator bits 810/812 and decoding results for the layer 2 CRC segment 1012 of the PCH message 1006. (The same method can apply to the discontinuous reception of F-CCCH messages 1026 with layer 2 CRC segments 1032.) In step 1302, the mobile wireless device 102 can awaken and re-acquire the wireless network 100 using an initial antenna. In a representative embodiment, the initial antenna can be a primary "preferred" antenna, while in another representative embodiment, the initial antenna can be a most recently used antenna. In step 1304, the mobile wireless device can compare a measured downlink signal quality to a pre-determined threshold. In a representative embodiment, the downlink signal quality can be measured using a received downlink signal strength, such as a received signal strength indicator (RSSI) or a received signal code power (RSCP), or using a received downlink signal quality, such as a measured signal (code power) to noise/interference ratio (EcIo) or signal to noise ratio (SNR). The downlink signal quality measurement can include filtering measured values to smooth instantaneous variation in measured values that can occur over short time periods. Thus, the downlink signal quality can be a "filtered" measured downlink signal quality. When the downlink signal quality exceeds the pre-determined threshold, the mobile wireless device 102 can subsequently decode page indicators 810/812 received on a quick paging channel 806 in step 1306. When the downlink signal quality does not exceed the pre-determined threshold, the mobile wireless device 102 can conclude that the page indicators can be unreliable (due to the poor received downlink signal quality) and can instead directly decode the paging channel using an initial antenna in step 1312 irrespective of what the page indicators can indicate.

Following decoding of the quick paging channel 806 page indicators 810/812 in step 1306, the mobile wireless device 102 can determine in step 1308 if either the first page indicator 810 or the second page indicator 812 decodes to an "OFF" value. When either the first page indicator 810 or the second page indicator 812 decodes to an "OFF" value as determined in step 1308, the mobile wireless device 102 can return to sleep in step 1322. When neither the first page indicator 810 nor the second page indicator 812 decodes to an "OFF" value, the mobile wireless device can subsequently determine with which antenna to decode the paging channel 802 based on the value decoded on the first page indicator 810. When the first page indicator 810 does not decode to an "erasure" value, the mobile wireless device 102 can decode the paging (PCH/F-CCCH) channel 802 in step 1314 using the initial antenna. When the first page indicator 810 decodes to an "erasure" value, then the mobile wireless device 102 can decode the paging channel 802 in step 1312 using an alternate antenna.

In step 1316, the mobile wireless device 102 can determine if a CRC segment 1012 of a signaling (paging) message 1006 received on the paging channel 802 correctly decodes as a "Pass". When the CRC segment 1012 of the signaling message 1006 decodes to a "Pass", the mobile wireless device 102 can determine in step 1318 if at least one CRC segment 1012 of a previously decoded signaling message 1006 received on the paging channel 802 during the same wake cycle decodes to a CRC "Fail". When the mobile wireless device 102 determines at least one CRC "Fail" is decoded in the current wake cycle and also that one CRC "Pass" is decoded in the current wake cycle, the mobile wireless device 102 can enable full receive diversity in step 1320. The decoded CRC "Fail" can indicate a poor receive signal quality condition that can warrant improving signal reception by using receive diversity through multiple antennas. Full receive diversity can include connecting multiple antennas 508/510 to multiple transceivers 504/506 in the mobile wireless device 102 to permit decoding of signals received through more than one antenna 508/510 during the next wake cycle. In step 1320, during the next wake cycle, the mobile wireless device 102 can also ignore the quick paging channel 806 (QPCH) and directly decoding the paging channel 802 using full diversity without decoding page indicator bits 810/812 on the paging channel 802. When the mobile wireless device 102 decodes a CRC "Pass" in step 1316 and does not decode a CRC "Fail" in the current wake cycle in step 1318, the mobile wireless device 102 can return to a sleep state in step 1322 without enabling receive diversity. The mobile wireless device 102 can then repeat the method from step 1302 in a wake portion of a subsequent DRX cycle.

Figure 13B:
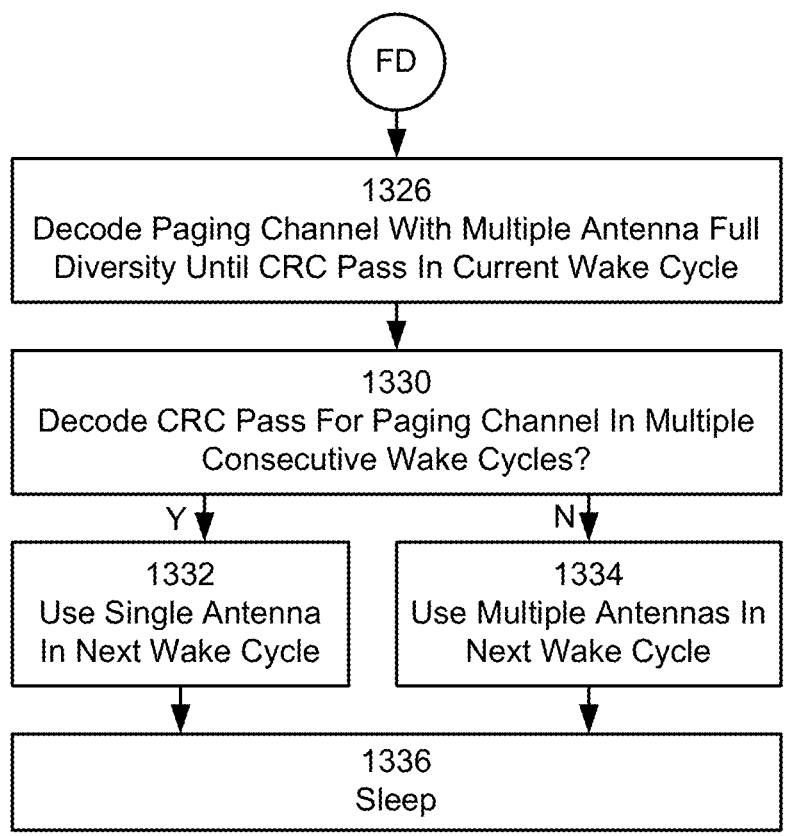

The mobile wireless device 102 can decode the paging channel PCH/F-CCCH 802 in steps 1312 and 1314 and continuously look for a received signaling message that decodes with a "Pass" CRC. When the mobile wireless device 102 does not decode a CRC "Pass", in step 1324, the mobile wireless device 102 can determine if a persistent CRC "Fail" condition exists or whether no CRC can be detected (CRC "Absence"). In a representative embodiment, persistent CRC "Failure" can be determined when decoding messages on the paging channel 802 that continuously result in CRC decoding failures for a pre-determined period of time or a pre-determined number of consecutive CRC decoding failures. CRC "absence" can occur when no CRC can be detected on the paging channel 802 by the mobile wireless device 102 for a pre-determined period of time. When the mobile wireless device 102 detects persistent CRC failure of a CRC absence in step 1324, the mobile wireless device 102 in step 1326 can enable full receive diversity and continue decoding of the paging channel 802 during the current wake cycle as shown in FIG. 13B by connecting through the circle labeled "FD". Decoding of the paging channel 802 in steps 1312 and 1314 of FIG. 13A can use a single antenna (e.g. 508 or 510) initially, while decoding of the paging channel 802 in step 1326 of FIG. 13B can use multiple antennas (e.g. 508 and 510) simultaneously to improve signal detection when receive signal conditions can be poor. When the mobile wireless device 102 does not decode a CRC "Pass" in step 1316 and subsequently does not detect persistent CRC failure or absence in step 1324, the mobile wireless device can continue to decode the paging channel 802 using a single antenna (either the initial antenna or the alternate antenna as chosen when entering step 1316) and return to check for a successful CRC "Pass" decode in step 1316.

In FIG. 13B, the mobile wireless device 102 can continue decoding the paging channel step 1326 during the current wake cycle using multiple antennas (e.g. 508 and 510) simultaneously. This decoding with multiple antennas can be referred to as full antenna diversity. Using full antenna diversity can improve received signal quality and therefore can improve the probability of error free decoding of the paging channel messages. When a CRC is decoded, the mobile wireless device in step 1330 can determine if a CRC "Pass" has been decoded during the current wake cycle and also been decoded for a number of previous consecutive wake cycles. When multiple consecutive wake cycles decode with a correct CRC "Pass", the mobile wireless device can revert to using a single antenna during the next wake cycle as indicated in step 1332 and subsequently sleep in step 1336. When an incorrect CRC "Fail" is decoded in the current wake cycle or when a pre-determined number of consecutive wake cycles have not decoded a correct CRC "Pass", then the mobile wireless device 102 can continue to use multiple antennas (i.e. full antenna diversity) in the next wake cycle as indicated in step 1334 and return to sleep in step 1336. As indicated in FIG. 13A, full antenna diversity can be enabled following at least one CRC failure during a wake cycle (even when at least one CRC pass can also occur during the same wake cycle). Full antenna diversity can also be enabled when persistent CRC failure or CRC absence occurs. The mobile wireless device 102 can return to using single antenna for decoding after a repeated CRC pass occurs for a pre-determined number of consecutive wake cycles.

The method 1300 outlined in FIGS. 13A and 13B provides several distinct results that balance performance with power consumption in selectively enabling receive diversity. Single bit page indicators PI1/PI2 810/812 can be read when received downlink signal quality is good and ignored when received downlink signal quality is poor. Thus power can be not wasted to read unreliable poor quality page indicators. An "OFF" detected on the first page indicator PI1 810 or on the second page indicator PI2 812 can return the mobile wireless device 102 to a sleep state to conserve power and not read the accompanying paging channel 802 during the DRX cycle. An erasure detected on the first page indicator PI1 810 can result in switching between an initial antenna and an alternate antenna, thereby decoding through an alternate path that can have superior signal quality while still using only one antenna and one transceiver (which can consume less power than multiple antennas and multiple receivers). The paging channel 802 can be decoded using signals received through a single antenna, and decoding of the page indicators 810/812 can provide an indication of signal quality received through the single antenna and thus can determine which single antenna to use when decoding the paging channel 802. When persistently unable to detect a "Pass" CRC on a paging channel 802 through a single antenna, the mobile wireless device 102 can enable receive diversity to receive signals through multiple antennas and continuing decoding of the paging channel 802 during the current wake portion of the DRX cycle. While consuming additional power, the use of multiple antennas can provide more reliable reception of the paging channel 802 during poor signal conditions. When decoding at least one "Fail" CRC and one "Pass" CRC using a single antenna in the wake portion of a DRX cycle, the mobile wireless device 102 can enable receive diversity during the next wake portion of a subsequent DRX cycle to improve detection and decoding of the paging channel 802. The quick paging channel 806 can be ignored when using receive diversity and the paging channel 802 can be read directly, as receive diversity can be enabled specifically when poor receive signal quality can exist, under which conditions single bit page indicators 810/812 can be considered less reliable.

FIGS. 14 to 19 outline a second detailed method 1400 to 1900 to adapt receive diversity in the mobile wireless device 102 during discontinuous reception. The steps illustrated in FIGS. 14 to 19 are interconnected through the circle entry and exit points labeled with letters A through H. The mobile wireless device 102 can cycle between a sleep state and a wake state in the discontinuous reception (DRX) mode of operation. The wake portion can include monitoring a paging channel 802 that can contain paging messages 1006 and a quick paging channel 806 that can provide paging indicators 810/812. The mobile wireless device 102 can be in one of five different states S1 to S5 during the sleep portion of a DRX cycle. When the mobile wireless device 102 awakens from sleep, the mobile wireless device can be in one of the five different states S1 to S5, and awakening in each state can result in a different sequence of steps as outlined in FIGS. 14 to 18 for states S1 to S5 respectively.

Figure 14:
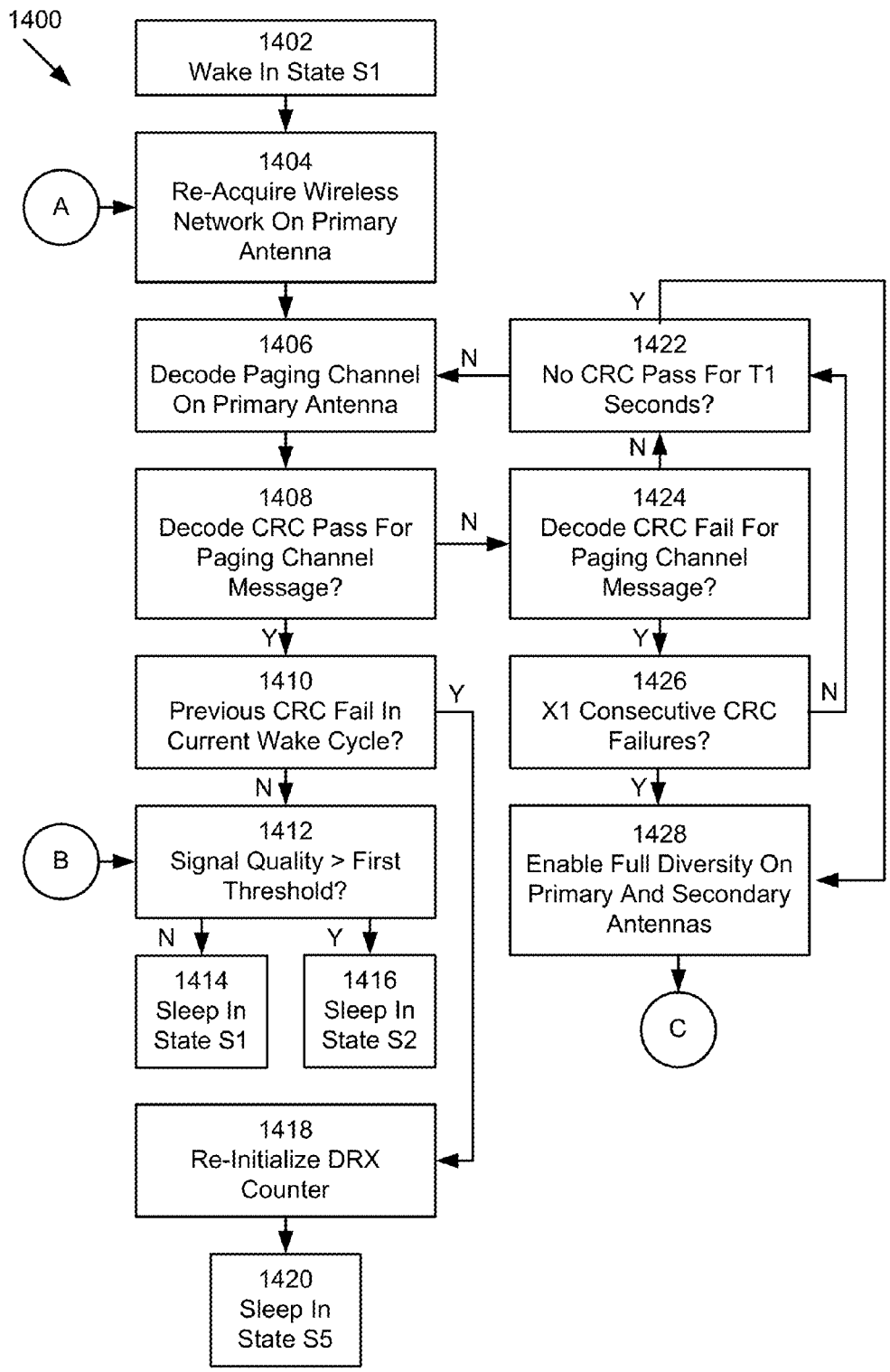
FIGS. 14-19 illustrates another representative method for adapting receive diversity for a mobile wireless device in a CDMA2000 1× wireless network.

From state S1 in FIG. 14, the mobile wireless device 102 can decode the paging channel 802 directly using a primary antenna without reading page indicator bits 810/812 on the quick paging channel 806. From state S2 in FIG. 15, the mobile wireless device 102 can decode page indicator bits 810/812 on the quick paging channel 806 using the primary antenna to determine whether to decode the paging channel 802 (and to determine which antenna to use for the subsequent decoding of the paging channel 802). State S3 in FIG. 16 can be considered similar to state S2 in FIG. 15 except the mobile wireless device 102 can use a secondary antenna in place of the primary antenna initially. In particular, from state S3 in FIG. 16, the mobile wireless device 102 can decode page indicator bits 810/812 on the quick paging channel 806 using the secondary antenna to determine whether to decode the paging channel 802 (and to determine which antenna to use for the subsequent decoding of the paging channel 802). State S4 in FIG. 17 can be considered similar to state S1 in FIG. 14 except that the mobile wireless device 102 can use a secondary antenna in place of the primary antenna initially. From state S4 in FIG. 17, the mobile wireless device 102 can decode the paging channel 802 directly using a secondary antenna without reading page indicator bits 810/812 on the quick paging channel 806. From state S5 in FIG. 18, the mobile wireless device can decode the paging channel 802 directly using full receive diversity through both the primary and secondary antennas together.

Returning to FIG. 14, in step 1402, the mobile wireless device 102 can awaken in state S1, and in step 1404, the mobile wireless device 102 can re-acquire the wireless network 100 using a primary antenna. The primary antenna can be a default antenna connected to a default receiver in the mobile wireless device 102. Re-acquisition can include detecting signals and aligning synchronization timing with a previously detected cell in the wireless network 100. In step 1406, the mobile wireless device 102 can decode the paging channel 802 directly using signals received through the primary antenna. In step 1408, the mobile wireless device 102 can determine if a paging channel message has been received on the paging channel 802 and decoded with a correct "Pass" CRC. When no paging channel message is received with a correct "Pass" CRC, the mobile wireless device can determine in step 1424 if a paging channel message has been received and decoded with an incorrect "Fail" CRC. If no paging channel message has been received with a correct "Pass" CRC or an incorrect "Fail" CRC, the mobile wireless device in step 1422 can determine if no paging channel message has been received with a correct "Pass" CRC for a predetermined period of time of T1 seconds. The determination in step 1422 of a continuous time period of T1 seconds with no "Pass" CRC can be implemented with a countdown timer. The countdown timer can be initialized to T1 seconds when decoding of the paging channel 802 in step 1406 begins, and the countdown timer can be reset to T1 seconds when a correct "Pass" CRC is received as determined in step 1408. When T1 seconds of decoding the paging channel 802 results in no CRC Pass (and no CRC Fail), the mobile wireless device 102 can transition to step 1428 and enable full receiver diversity. With full receive diversity enabled, the mobile wireless device 102 can receive signals through both the primary antenna and the secondary antennas. In a representative embodiment, the primary antenna can be connected to one transceiver and the secondary antenna can be connected to a second transceiver through a dual pole dual throw switch 512 in the mobile wireless device 102. With full receive diversity enabled, the mobile wireless device 102 can continue decoding the paging channel 802 as indicated in FIG. 14 by transitioning through the circle "C" to step 1806 shown in FIG. 18.

The cycle of steps 1406 to 1408 to 1424 to 1422 and back to 1406 in FIG. 14 can provide a continuous decoding of the paging channel 802 by the mobile wireless device 102 using the primary antenna to search for a paging channel message 1006 with a "Pass" CRC. After receiving a paging channel message 1006 with a CRC Fail as determined in step 1424, the mobile wireless device 102 can determine if a number (X1) of consecutive paging messages 1006 have been received with CRC Fail. When X1 consecutive CRC failures have occurred, the mobile wireless device 102 can transition to full received diversity in step 1428 to continue decoding of the paging channel 802 using signals received from multiple antennas. When X1 consecutive CRC failures have not yet occurred as determined in step 1426, the mobile wireless device 102 can transition to step 1422 to determine if no paging channel messages 1006 have been received within a predetermined T1 seconds of decoding the paging channel 802. The steps 1426 and 1428 can provide a determination of poor signal reception when multiple consecutive "incorrect" CRC are received or when no "correct" CRC is received within a pre-determined period of time. Decoding with multiple antennas, i.e. with full receive diversity, can improve signal reception and thus improve decoding of the paging channel 802.

When the mobile wireless device 102 receives a paging channel message 1006 with a "correct" CRC Pass and no additional paging channel messages 1006 are expected in the current wake cycle (i.e. mobile wireless device 102 does not need to receive until the next wake cycle), the mobile wireless device 102 can determine in step 1410 if one or more previous paging channel messages 1006 was decoded with an "incorrect" CRC Fail during the current wake portion of the DRX cycle. When receiving at least one "incorrect" CRC Fail as determined in step 1410 and a "correct" CRC Pass as determined in step 1408 during decoding of the paging channel 802 in a single wake portion of the current DRX cycle, the mobile wireless device 102 can transition to step 1418 and re-initialize a discontinuous reception (DRX) counter followed by returning to sleep in step 1420 in state S5. When the mobile wireless device 102 wakens from state S5 for a next wake portion of a DRX cycle to decode the paging channel, the mobile wireless device will execute step 1802 shown in FIG. 18. The reception of a paging channel message 1006 with an incorrect CRC Fail can indicate a lower level of signal quality. As such, the mobile wireless device 102 can awaken in the next DRX cycle using receive diversity to improve signal reception.

After receiving a paging channel message 1006 with a correct CRC Pass in step 1408 and when not receiving a paging channel message 1006 with an incorrect CRC Fail (in steps 1424 or 1420), the mobile wireless device 102 can compare a receive signal quality to a pre-determined first threshold in step 1412. The receive signal quality can be a measure of signal quality such as a receive signal code power to noise/interference ration (EcIo) and can be a filtered measure that averages measurements of receive signal quality over a period of time. When the receive signal quality does not exceed the pre-determined first threshold in step 1412, the mobile wireless device 102 can return to sleep in state S1 in step 1414. When the mobile wireless device 102 re-awakens in state S1 during the next DRX cycle, the mobile wireless device 102 can repeat the method steps outlined in FIG. 14 from the initial step 1402. A lower level of receive signal quality can indicate that decoding the paging channel 802 directly without decoding the quick paging channel indicator bits 810/812 can be preferred. When the receive signal quality exceeds the pre-determined first threshold in step 1412, the mobile wireless device 102 can sleep in state S2 in step 1416. Awakening from sleep in a wake portion of a subsequent DRX cycle, the mobile wireless device 102 can continue as shown next in FIG. 15.

Figure 15:
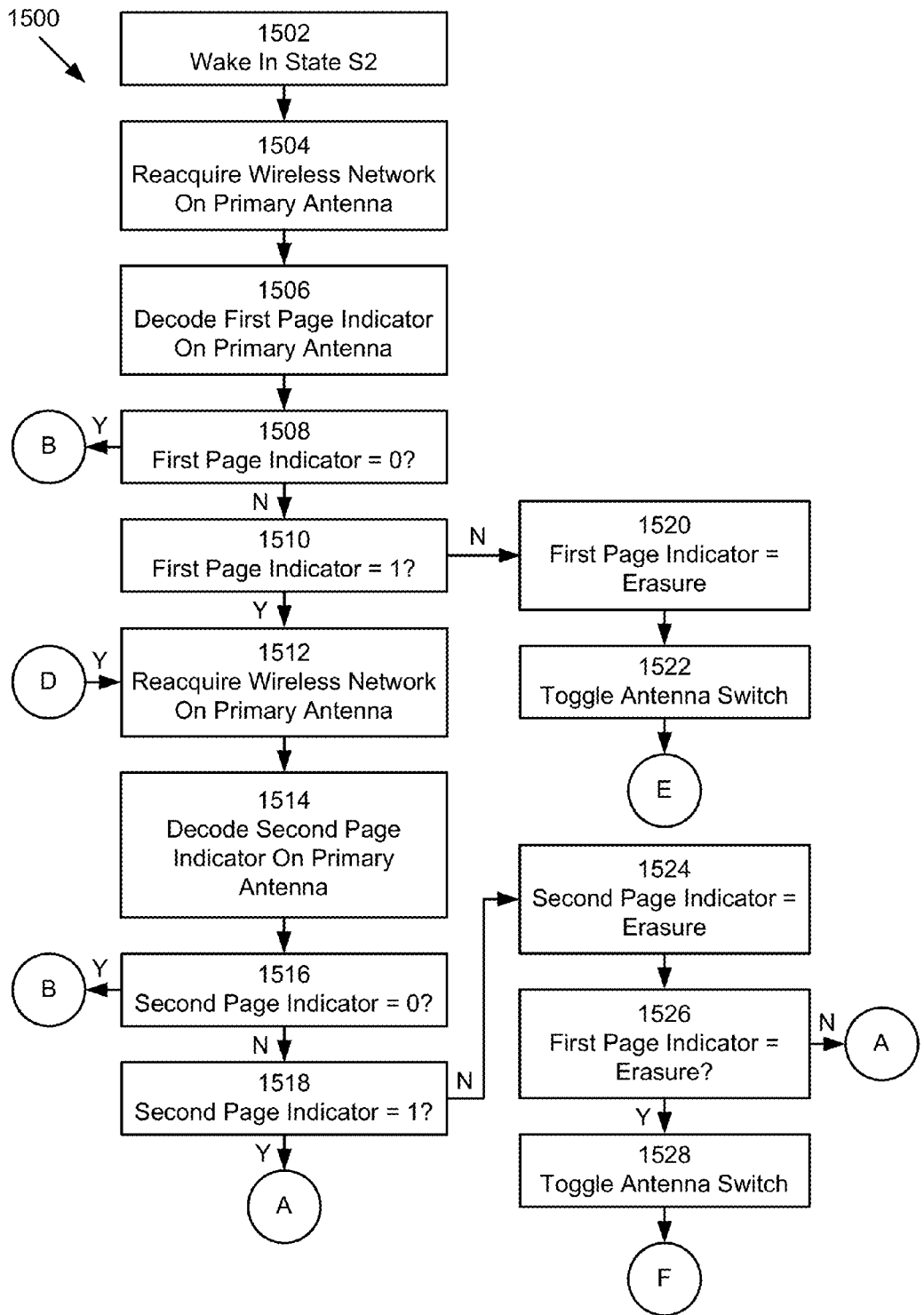

FIG. 15 illustrates a series of steps 1500 that the mobile wireless device 102 can take when awakening from sleep in state S2 in step 1502. The mobile wireless device 102 can re-acquire the wireless network 100 using signals received through the primary antenna in step 1504. The mobile wireless device 102 can then receive signals on a quick paging channel 806, and in particular decode a first page indicator 810 using signals received through the primary antenna in step 1506. The received first page indicator 810 can be a single bit that can be interpreted as one of three possible values, a "zero" value, a "one" value and an "erasure" value. (Note that the "zero" value for an "OFF" indication of no paging message 1006 and a "one" value for an "ON" indication of a paging message 1006 is arbitrary and can alternatively be swapped, i.e. "OFF" could be a "one" value and "ON" could be a "zero" value.) The mobile wireless device 102 can determine the value of the received first page indicator 810 in steps 1508, 1510 and 1520. When the first page indicator bit 810 decodes to a zero value in step 1508, which can indicate no paging message 1006 for the mobile wireless device 102 on the parallel paging channel 802, the mobile wireless device 102 can exit decoding of the quick paging channel 806 and can directly determine a next sleep state based on the receive signal quality by re-entering step 1412 in FIG. 12 as indicated by the circle "B". When the first page indicator 810 decodes to an "erasure" in step 1520, the mobile wireless device 102 can determine that the current antenna in use (the primary antenna) can be unreliable and can toggle the DPDT switch in step 1522 to route signals from the secondary antenna to the receiver. The mobile wireless device 102 can then continue decoding of the quick paging channel 806 using the secondary antenna by entering step 1612 as indicated by the circle "E" in FIG. 16.

When the first page indicator 810 decodes to a "one" value in step 1510, the mobile wireless device 102 can optionally sleep and subsequently reacquire the wireless network 100 on the primary antenna in step 1512 and decode a received second page indicator 812 through the primary antenna in step 1514. As with the first page indicator bit 810, the received second page indicator 812 can be a single bit that can be interpreted as a "zero", a "one" or an "erasure". When the second page indicator 812 decodes to a "zero" in step 1516, the mobile wireless device 102 can exit decoding of the quick paging channel 806 and can directly determine a next sleep state based on the receive signal quality by re-entering step 1412 in FIG. 12 as indicated by the circle "B". Thus when a single page indicator bit 810 is unequivocally received as a "zero" value indicating that no paging message 1006 is intended for the mobile wireless device 102 on the paging channel 802, the mobile wireless device 102 can return to a sleep state. The quality of the received signal quality can be used to determine in which state to sleep and subsequently re-awaken. Page indicators 801/812 on the quick paging channel 806 can be considered more reliable and therefore merit decoding when signal quality is high and less reliable and therefore warrant not decoding when signal quality is low.

When the second page indicator 812 decodes to a "one" value in step 1518, the mobile wireless device 102 can transition as indicated by the circle "A" to step 1404 in FIG. 14 in order to decode the paging channel 802 using the primary antenna as previously described above. When the second page indicator 812 decodes to an "erasure" value in step 1524 and when the first page indicator 810 decodes to an "erasure" value in step 1526, the mobile wireless device 102 can toggle the DPDT switch in step 1528 and transition through the circle "F" to step to step 1704 in FIG. 17 to decode the paging channel 802 using the secondary antenna. When the first page indicator 810 does not decode to an "erasure" in step 1526, the mobile wireless device 102 can transition through the circle "A" to step 1404 in FIG. 14 to decode the paging channel 802 using the primary antenna. FIG. 15 illustrates the mobile wireless device 102 using the page indicator bit 810/812 decoded values to determine whether to decode the paging channel 802 and which antenna to use for the decoding of the paging channel 802. In FIG. 15, the mobile wireless device 102 starts decoding the page indicators 810/812 using the primary antenna, while in FIG. 16, the mobile wireless device 102 starts decoding the page indicators 810/812 using the secondary antenna.

Figure 16:
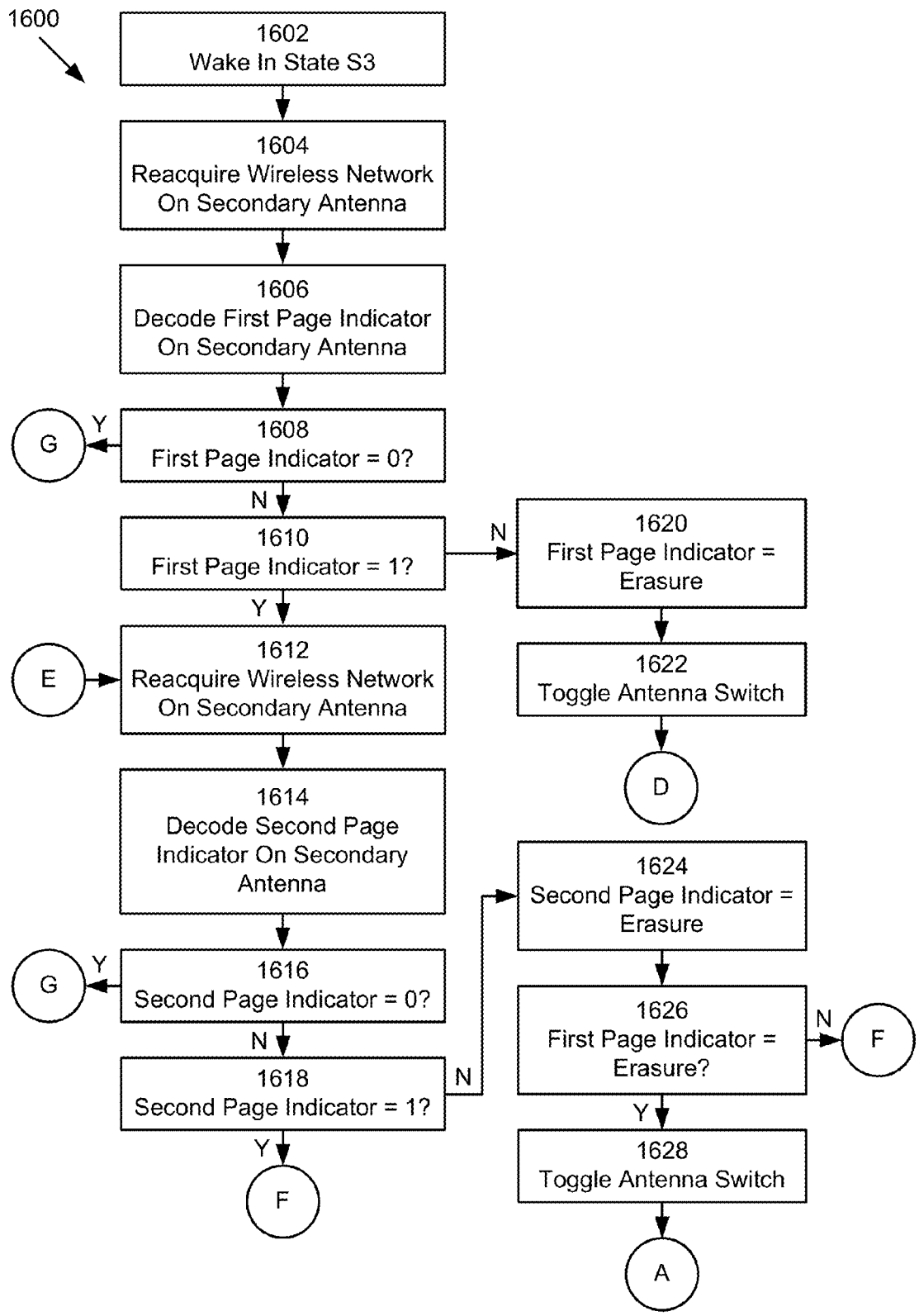

FIG. 16 illustrates a series of steps that the mobile wireless device 102 can take when awakening from sleep in state S3 in step 1602. The mobile wireless device 102 can reacquire the wireless network 100 in step 1604 using signals received through the secondary antenna. The mobile wireless device 102 can then decode the first page indicator 810 received through the secondary antenna in step 1606 and subsequently can determine its value. When the first page indicator 810 decodes to a "zero" value in step 1608, the mobile wireless device 102 can conclude no signaling (paging) message 1006 exists on the paging channel 802 and can transition through the circle "G" to return to a sleep state based on a received signal quality starting in step 1712 of FIG. 17. The received signal quality can be compared to a pre-determined first threshold as indicated in step 1712. When the received signal quality exceeds the first threshold in step 1712, the mobile wireless device 102 can return to sleep in state S3 in step 1716. When the received signal quality does not exceed the first threshold in step 1712, the mobile wireless device 102 can sleep in state S4 in step 1714.

Returning to FIG. 16, when the received first page indicator 810 decodes to a "one" value in step 1610, the mobile wireless device 102 can optionally sleep (not shown) and then can re-acquire the wireless network 100 using signals received through the secondary antenna in step 1612. The mobile wireless device 102 can subsequently decode a second page indicator 812 received through the secondary antenna in step 1614 and determine its value. When the received second page indicator 812 decodes to a "zero" value in step 1616, the mobile wireless device 102 can conclude there is no forthcoming paging channel message 1006. The mobile wireless device 102 can transition through the circle "G" to return to sleep based on the received signal quality as determined in step 1712 of FIG. 17.

Figure 17:
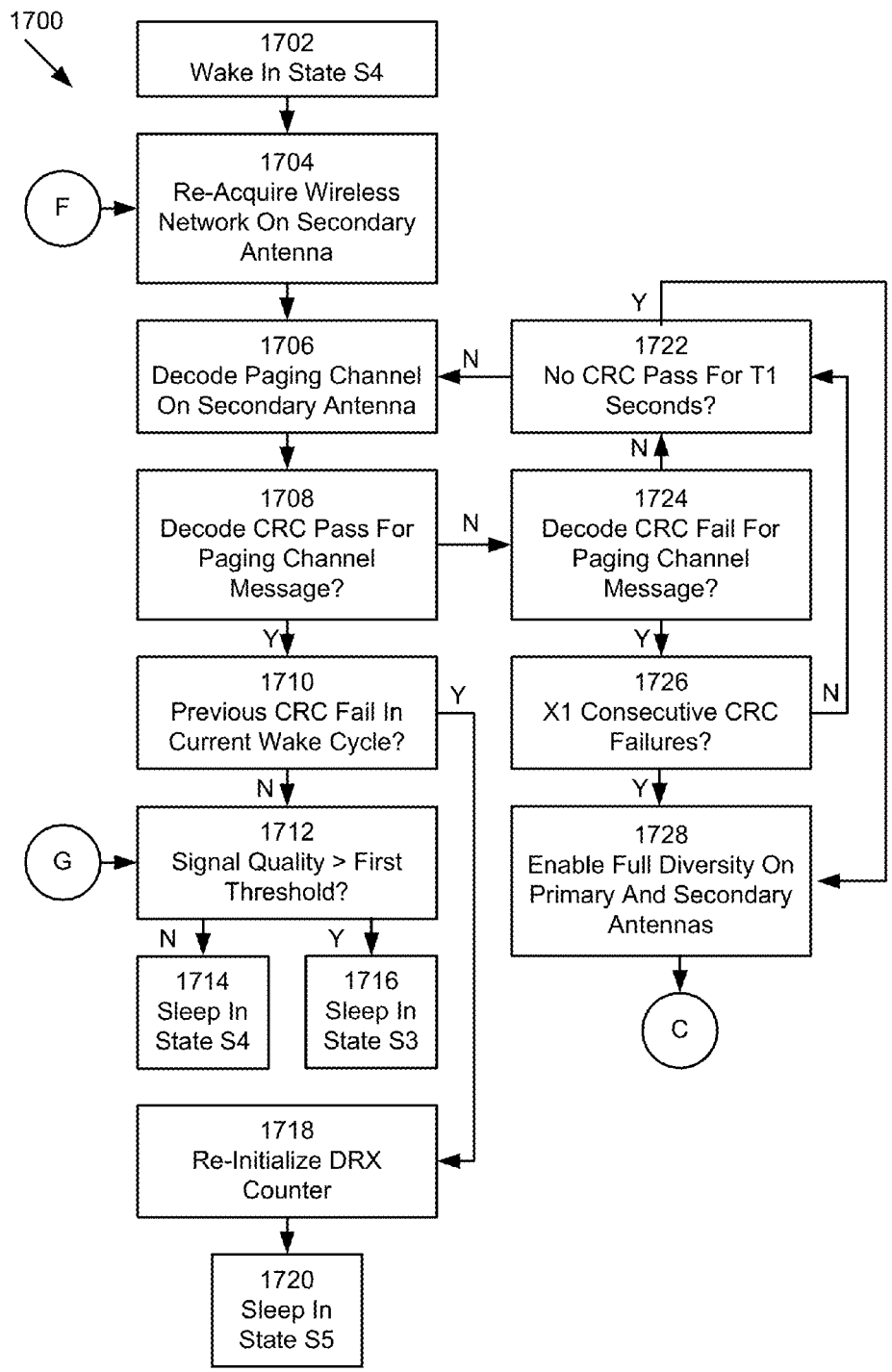

When the received second page indicator 812 decodes instead to a "one" value in step 1618, the mobile wireless device 102 can decode the paging channel 802 based on signals received through the secondary antenna by transitioning through the circle "F" to step 1704 in FIG. 17. Otherwise, when the received second page indicator 812 decodes to an "erasure" value in step 1624 and the received first page indicator 810 also decodes to an "erasure" in step 1626, the mobile wireless device 102 can toggle the antenna switch back to the primary antenna from the secondary antenna in step 1628 and transition through the circle "A" to step 1404 of FIG. 14 to decode the paging channel 802 using the primary antenna. When the received second page indicator 812 decodes to an "erasure" value in step 1624 and the received first page indicator 810 does not decode to an "erasure" in step 1626, the mobile wireless device 102 can transition through circle "F" to decode the paging channel 802 using signals received through the secondary antenna starting in step 1704 of FIG. 17.

When the received first page indicator 810 does not decode to a "zero" in step 1608 and does not decode to a "one" in step 1610, the mobile wireless device 102 can conclude the first page indicator 810 decodes to an "erasure" in step 1620. Receipt of the first page indicator 810 with an "erasure" can indicate poor signal quality received through the secondary antenna. In response, the mobile wireless device 102 can toggle the DPDT switch in step 1622 from the secondary antenna to the primary antenna and transition through circle "D" to step 1512 in FIG. 15 to decode the second page indicator 812 using the primary antenna. An "erasure" on the first page indicator 810 can cause the DPDT switch to toggle once to attempt decoding of the second page indicator 812 on a different antenna from the antenna used for decoding the first page indicator 810. A second "erasure" on the second page indicator 810 can cause the DPDT switch to toggle back again to the primary antenna before decoding the paging channel 802 or returning to sleep. An "erasure" on the second page indicator 812 only without an "erasure" on the first page indicator 810 can result in no change in the DPDT switch with the same antenna used for decoding both page indicators 810/812 and the associated paging channel 802.

FIG. 17 illustrates a series of steps 1700 similar to those illustrated in FIG. 14 except the mobile wireless device 102 awakens in state S4 in step 1702 and re-acquires the wireless network 100 on the secondary antenna in step 1704. (FIG. 14 starts with the mobile wireless device 102 using the primary antenna first.) In step 1706, the mobile wireless device 102 can begin decoding the paging channel 802 using signals received through the secondary antenna. The mobile wireless device 102 can continue to decoding the paging channel 802 checking for a paging channel message 1006 and determining a CRC "Pass" or "Fail" condition in steps 1708 and 1724. When the mobile wireless device 102 receives a paging channel message 1006 that decodes with a correct "Pass" CRC and confirms that there are no more paging channel messages 1006 expected during the current wake cycle, the mobile wireless device 102 can stop decoding the paging channel 802 and return to a sleep state. The sleep state to which the mobile wireless device 102 returns can depend on whether a paging message 1006 was received in the current wake cycle with an incorrect "Fail" CRC as determined in step 1710. If the mobile wireless device 102 receives both a correct "Pass" CRC and at least one incorrect "Fail" CRC during the same wake portion of the DRX cycle when decoding the paging channel 802, the mobile wireless device 102 can re-initialize a DRX counter in step 1718 and sleep in state S5 in step 1720. When awakening from state S5, the mobile wireless device 102 can use full receive diversity (i.e. signals received from multiple antennas) to decode the paging channel 802 to improve signal detection and decoding. When the mobile wireless device 102 receives a paging channel message 1006 with a correct "Pass" CRC in step 1708 and does not receive a paging channel message 1006 with an incorrect "Fail" CRC in the same wake portion of the DRX cycle, the mobile wireless device 102 can return to a sleep state based on a receive signal quality determination in step 1712. When the receive signal quality exceeds the first pre-determined threshold in step 1712, the mobile wireless device 102 can return to sleep in state S3, out of which the mobile wireless device 102 can decode paging indicators 810/812 on the quick paging channel 806. When the receive signal quality does not exceed the first pre-determined threshold in step 1712, the mobile wireless device 102 can return to sleep in state S4, from which the mobile wireless device 102 can decode the paging channel 802 directly and can ignore the quick paging channel 806.

The mobile wireless device 102 can cycle through steps 1706, 1708, 1724 and 1722 when decoding the paging channel 802 on the secondary antenna in search of a paging channel message 1006 received with a correct "Pass" CRC. A paging channel decoding countdown timer can be started at a predetermined value of T1 seconds when beginning the decoding of the paging channel 802 on the secondary antenna in step 1706. The paging channel decoding countdown timer can be reset to the predetermined value of T1 seconds whenever a correct "Pass" CRC for a paging channel message 1006 is received. When no paging channel message 1006 is received by the mobile wireless device 102 with a "Pass" CRC for a period of T1 seconds of decoding the paging channel 802 as determined in step 1722, the mobile wireless device 102 can enable full receive diversity to use multiple antennas in step 1728. The mobile wireless device 102 can subsequently continue to decode the paging channel 802 with full receive diversity by transitioning through circle "C" to step 1806 in FIG. 18. The mobile wireless device 102 can also keep track of the number of paging channel messages 1006 received during a wake portion of a current DRX cycle that decode with an incorrect "Fail" CRC. When the mobile wireless device 102 receives a number (X1) of consecutive paging messages 1006 with an incorrect "Fail" CRC as determined in step 1726, the mobile wireless device 102 can enable full diversity in step 1728 and continue decoding with full diversity in step 1806 of FIG. 18. After decoding the paging channel 802 continuously without detecting a CRC "Pass" or detecting multiple consecutive CRC "Fail", the mobile wireless device 102 can conclude that signal quality received through the single secondary antenna can be insufficient. By enabling full receive diversity with multiple antennas in step 1728, the mobile wireless device 102 can improve the receive signal quality and thus improve detection and decoding of paging channel messages 1006 received on the paging channel 802.

Figure 18:
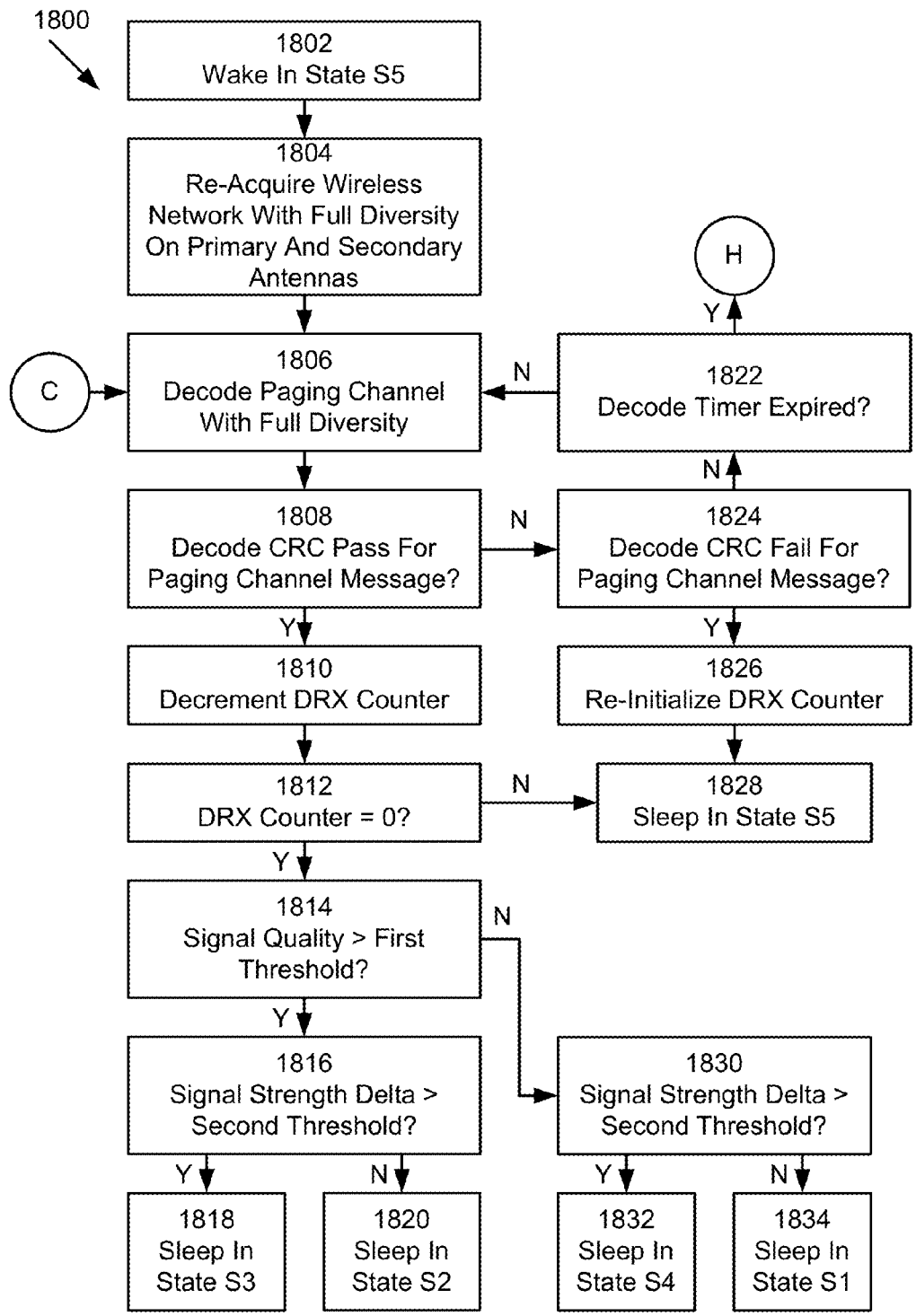

FIG. 18 illustrates a series of steps 1800 that the mobile wireless device 102 can perform to decode the paging channel 802 with full receive diversity through multiple antennas. In step 1802, the mobile wireless device 102 can awaken in state S5, and in step 1804, the mobile wireless device 102 can re-acquire the wireless network 100 with full diversity using signals received through both the primary antenna and the secondary antennas. In step 1806, the mobile wireless device 102 can decode the paging channel 802 with full receive diversity continuously searching for paging channel messages 1006 with a correct "Pass" CRC. When the mobile wireless device 102 receives a paging channel message 1006 with a correct "Pass" CRC as determined in step 1808 and when the mobile wireless device 102 confirms that there is no additional paging channel messages 1006 expected in the current wake cycle, the mobile wireless device 102 can decrement a DRX counter in step 1810. The DRX counter can have been re-initialized in step 1418/1718/1826 before returning to sleep 1420/1720/1828 in state S5 from which the mobile wireless device 102 awakens in step 1802. The DRX counter can count down a number of DRX cycles in which the mobile wireless device 102 successfully decodes a paging channel message 1006 with a correct "Pass" CRC while using full receive diversity. The DRX counter can provide a form of hysteresis, in which the mobile wireless device 102 can continue to use full receive diversity with multiple antennas to decode the paging channel 802 for a pre-determined number of consecutive wake cycles with successful "Pass" CRC and without an incorrect "Fail" CRC before returning to using only a single antenna. When the DRX counter does not equal zero as determined in step 1812, the mobile wireless device 102 can sleep in state S5 as indicated in step 1828.

When the DRX counter does equal zero as determined in step 1812, the mobile wireless device 102 can use both a receive signal quality and a receive signal strength to determine in which state to sleep before re-awakening in a subsequent DRX cycle. In a representative embodiment, the receive signal quality can be a measure of received signal code power divided by the total receive noise and interference level (EcIo). The receive signal strength can be a receive signal code power (RSCP) or measured received pilot strength or another similar measure of receive signal power monitored by the mobile wireless device 102. Both the receive signal strength and the receive signal quality can be filtered over time to smooth out instantaneous measurement variation. When the receive signal quality exceeds a pre-determined first threshold in step 1814, the mobile wireless device 102 can sleep in a state out of which a single antenna can be subsequently used for monitoring page indicators 810/812 on the quick paging channel 806. The mobile wireless device 102 can select between the primary antenna and the secondary antenna by comparing a signal strength delta (difference) between a signal strength measured on the secondary antenna and a signal strength measured on the primary antenna. The signal strength delta can be compared to a pre-determined second threshold in step 1816. When the signal strength delta exceeds the pre-determined second threshold in step 1816, the mobile wireless device 102 can sleep in state S3 as shown in step 1818. (From state S3, the mobile wireless device 102 can awaken to use signals received on the secondary antenna as shown in FIG. 16.) When the signal strength delta does not exceed the pre-determined second threshold in step 1816, the mobile wireless device 102 can sleep in state S2 as indicated in step 1820. (From state S2, the mobile wireless device 102 can awaken to use signals received on the primary antenna as shown in FIG. 15.)

When the receive signal quality does not exceed the pre-determined first threshold in step 1814, the mobile wireless device 102 can sleep in a state out of which a single antenna can be subsequently used for monitoring the paging channel 802 directly and can skip over monitoring the paging indicators 810/812 on the quick paging channel 806. The calculated signal strength delta can be used to select in which state to sleep and from which state to awaken in the next cycle. When the signal strength delta exceeds the pre-determined second threshold in step 1830, the mobile wireless device 102 can sleep in state S4 as shown in step 1832. (From state S4, the mobile wireless device 102 can awaken to use signals received on the secondary antenna as shown in FIG. 17.) When the signal strength delta does not exceed the pre-determined second threshold in step 1830, the mobile wireless device 102 can sleep in state S1 as indicated in step 1834. (From state S1, the mobile wireless device 102 can awaken to use signals received on the primary antenna as shown in FIG. 14.) The measured (and filtered) receive signal quality can be thus used to select whether to decode page indicators 810/812 in the wake portion of the next DRX cycle or to decode the paging channel 802 directly. The measured (and filtered) receive signal strength delta (a measure of a difference in signal strengths received through the two antennas) can be used to select which of the two antennas to decode in the next DRX cycle.

When the mobile wireless device 102 receives a paging channel message 1006 that decodes with an incorrect CRC "Fail" in step 1824, the DRX counter can be re-initialized in step 1826, and the mobile wireless device 102 can return to sleep in state S5 as indicated in step 1828. The DRX counter can be re-initialized each time an incorrect CRC "Fail" is detected while decoding the paging channel 802 with full receive diversity to keep the mobile wireless device 102 in state S5 until receive signal quality improves (as measured by a number of wake cycles with successful CRC "Pass" detections.) When continuously decoding the paging channel 802 with full diversity, a decoding timer can be started when entering step 1806. The decoding timer can run while the mobile wireless device 102 traverses the cycle of steps 106 to 1808 to 1824 to 1822 and back to 1806 again. The decoding timer can be reset whenever a correct CRC "Pass" is detected. When the decoding timer expires in step 1822, the mobile wireless device 102 is unable to receive a paging channel message 1006 with any detected CRC for a continuous pre-determined period of time, even when using full receive diversity with signals received through both the primary and secondary antennas. In this circumstance, the mobile wireless device 102 can transition to perform a system determination through circle "H" to step 1904 in FIG. 19.

The method steps outlined in FIGS. 13, 14, 17 and 18 include checking a layer 2 CRC segment 1012 received as part of a layer 2 paging channel message 1006. The same steps can also apply to checking a layer 2 CRC segment 1032 received as part of a layer 2 control channel message 1026 or more generally to detecting transmission errors in received signaling messages that include layer 2 CRC segments. In addition to error detection for layer 2 messages, a mobile wireless device 102 can use a protocol that includes error detection for layer 1 such as the layer 1 CRC segment attached to an F-CCCH frame shown in FIG. 10B. A single layer 2 F-CCCH message 1026 can include one or more F-CCCH frames, and each F-CCCH frame can include a separate layer 1 CRC. The method steps outlined in FIGS. 13, 14, 17 and 18 can be extended to include checking for CRC "Pass" or CRC "Fail" using the layer 1 CRC rather than (or in addition to) the layer 2 CRC segment 1032. In the mobile wireless device 102, layer 1 processing of layer 1 frames can occur before segmentation and reassembly (SAR) of the layer 2 segment and thus detection of errors can occur earlier and more frequently (as multiple layer 1 CRC segments can be included in a single layer 2 F-CCCH message 1026). When using layer 1 CRC to detect CRC "Fail" conditions, the number of consecutive CRC failures in step 1426 of FIG. 14 and in step 1726 in FIG. 17 can differ from the number of consecutive CRC failures used with layer 2 CRC failures. Similarly, the amount of time used to determine an absence of CRC passing in step 1422 of FIG. 14 and in step 1722 in FIG. 17 can be the same or can differ when using layer 1 CRC versus layer 2 CRC.

Figure 19:
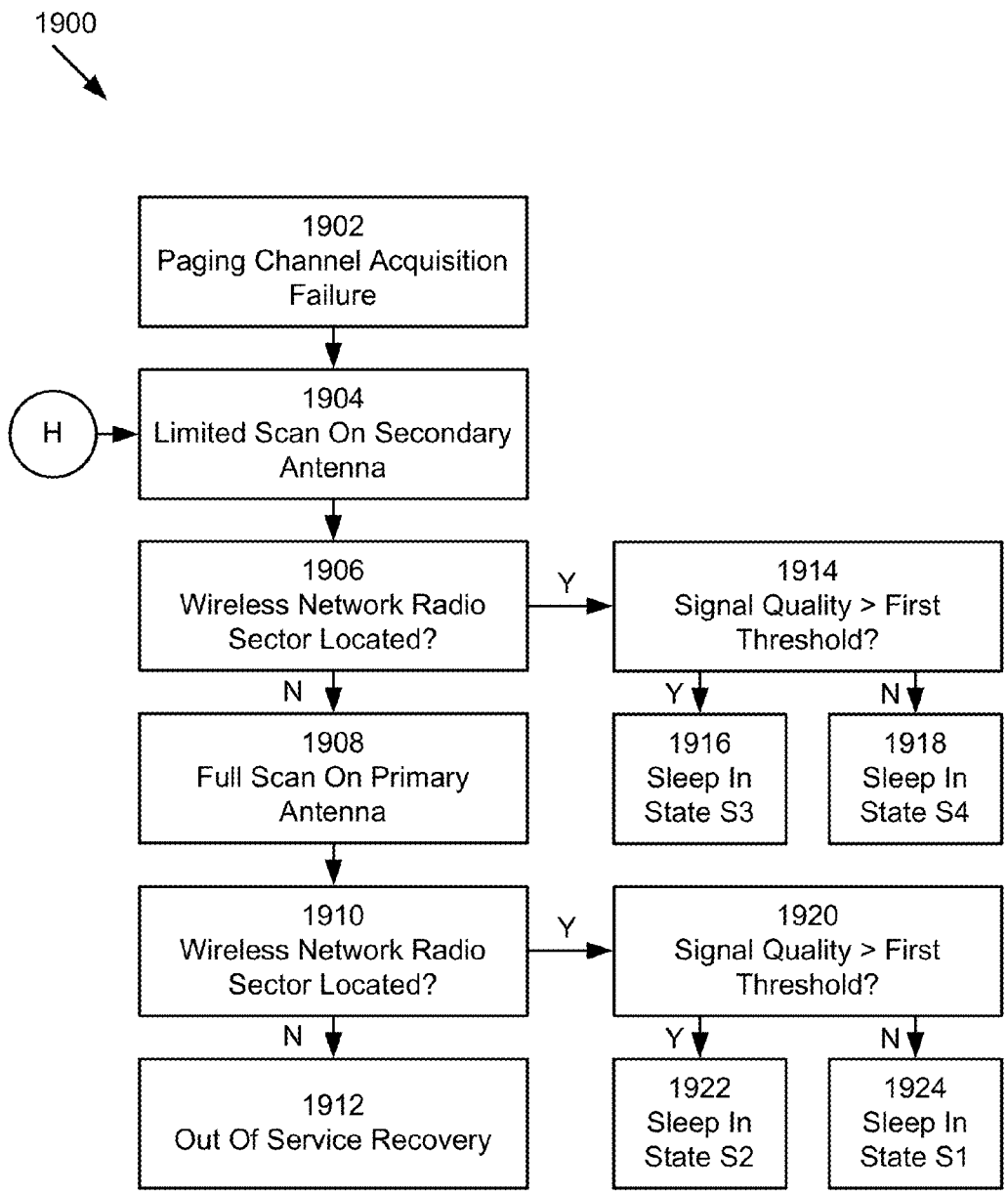

FIG. 19 illustrates a series of steps 1900 that the mobile wireless device 102 can undertaken when unable to re-acquire the paging channel 802 or following a paging channel 802 decoding timer expiration. Each DRX cycle, the mobile wireless device 102 can re-awaken from one of the five sleep states described above and can re-acquire the wireless network 100 using one antenna or multiple antennas to decode the paging channel 802 (and/or the quick paging channel 806). The mobile wireless device 102 can also optionally sleep between reading two distinct paging indicators 810/812 on the quick paging channel 806 during a single DRX cycle. When the mobile wireless device 102 is unable to re-acquire the wireless network 100 to decode the paging channel 802 in step 1902, the mobile wireless device 102 can perform a limited scan for radio sectors 104 (cells) in the wireless network 100 in step 1904 using signals received through the secondary antenna. In a representative embodiment, the limited scan can include searching for one or two radio sectors 104 in a list of most recently used radio sectors 104 stored in the mobile wireless device 102. When the mobile wireless device 102 locates a radio sector 104 in step 1906, the mobile wireless device 102 can compare a received signal quality to a pre-determined first threshold in step 1914 to determine in which state to sleep. The received signal quality can be a filtered measured signal quality such as a ratio of received signal code power to noise/interference (EcIo). When the received signal quality exceeds the first threshold as determined in step 1914, the mobile wireless device 102 can sleep in state S3 in step 1916. From state S3, the mobile wireless device 102 can later awaken to decode page indicators 810/812 on the quick paging channel 806 using signals received through the secondary antenna as shown in FIG. 16. When the received signal quality does not exceed the first threshold as determined in step 1914, the mobile wireless device 102 can sleep in state S4 in step 1916. From state S4, the mobile wireless device 102 can re-awaken to decode the paging channel 802 directly using signals received through the secondary antenna as shown in FIG. 17.

When the limited scan for radio sectors 104 of the wireless network 100 using signals received through the secondary antenna fails in step 1906, the mobile wireless device 102 can perform a full scan for radio sectors 104 of the wireless network 100 using signals received through the primary antenna in step 1908. In a representative embodiment, the full scan for radio sectors 104 can include those radio sectors 104 searched for in step 1904 during the limited scan with signals received through the secondary antenna and additional radio sectors 104 stored in one or more lists in the mobile wireless device 102. When no radio sector 104 can be located using the primary antenna in step 1910, the mobile wireless device 102 can enter an "out of service" recovery process in step 1912. When a radio sector 104 in the wireless network is located in step 1910 using signals received through the primary antenna, the mobile wireless device 102 can compare the receive signal quality to the pre-determined first threshold in step 1920 to determine in which state to sleep. When the receive signal quality exceeds the pre-determined first threshold in step 1920, the mobile wireless device 102 can sleep in state S2 as indicated in step 1922. From state S2, the mobile wireless device 102 can awaken to decode page indicators 810/812 on the quick paging channel 806 using signals received through the primary antenna as shown in FIG. 15. When the receive signal quality does not exceed the pre-determined first threshold in step 1920, the mobile wireless device 102 can sleep in state S1 as indicated in step 1924. From state S1, the mobile wireless device can awaken to decode the paging channel 802 directly using signals received through the primary antenna as shown in FIG. 14.

In another embodiment (not shown explicitly in FIG. 19), the mobile wireless device 102 can interrupt a full scan on the primary antenna in step 1908 periodically to perform a partial scan using the secondary antenna. The periodic partial scans can use the same limited set of radio sectors 104 as in step 1904 or can include additional logic to search for radio sectors 104 other than (or in addition to) the limited set of radio sectors 104 used in step 1904. The full scan on the primary antenna can be performed using an extensive list of radio sectors 104, while each partial scan on the secondary antenna can use a smaller list of radio sectors 104. The smaller list of radio sectors 104 used for the secondary antenna can vary for each successive partial scan attempt covering a broader list of radio sectors 104 over a number of separate partial scans.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of adapting antenna receive diversity in a mobile wireless device in communication with a wireless network, the method comprising:
   during a discontinuous reception cycle in the mobile wireless device,
   decoding at least one page indicator received on a page indicator channel through an initial antenna when a measured downlink signal quality exceeds a pre-determined threshold;
   decoding one or more page messages received on a paging channel through the initial antenna without decoding the page indicator channel when the measured downlink signal quality does not exceed the pre-determined threshold;
   where the paging channel and the page indicator channel are separate;
   decoding one or more page messages received on the paging channel through an alternate antenna when a first page indicator received on the page indicator channel through the initial antenna decodes as an erasure value, where the erasure value indicates that an unequivocal value is not present; and
   decoding one or more page messages received on the paging channel through the initial antenna and through the alternate antenna together and ignoring the page indicator channel when no paging message received on the paging channel through the initial antenna or through the alternate antenna alone decodes with a correct error checking code for a pre-determined period of time during the discontinuous reception cycle.

2. The method as recited in claim 1, further comprising:
   decoding one or more page messages received on the paging channel through the initial antenna and through the alternate antenna together during a subsequent discontinuous reception cycle after decoding an incorrect error checking code in the current discontinuous reception cycle.

3. The method as recited in claim 2, further comprising:
   ignoring the page indicator channel when decoding using the initial antenna and the alternate antenna together.

4. The method as recited in claim 1, further comprising:
switching from decoding the paging channel with one antenna to decoding with multiple antennas after measuring a first pre-determined number of incorrect consecutive error checking codes; and
switching from decoding the paging channel with multiple antennas to decoding the paging channel with one antenna after measuring a second pre-determined number of correct consecutive error checking codes.

5. The method as recited in claim 4, further comprising:
measuring the second pre-determined number of correct consecutive error checking codes by counting consecutive discontinuous reception cycles that contain at least one correct error checking code and no incorrect error checking codes.

6. The method as recited in claim 1, further comprising:
before decoding the at least one page indicators on the page indicator channel, selecting the initial antenna from a plurality of antennas based on a measurement of signal strength received through each of the plurality of antennas.

7. The method as recited in claim 1 wherein the wireless network operates using a CDMA2000 1× communications protocol.

8. The method as recited in claim 7 wherein the error checking code is a layer 2 CRC segment of a layer 2 paging channel message.

9. A mobile wireless device in communication with a wireless network and adapted for antenna receive diversity, comprising:
a processor configured to, during a discontinuous reception cycle in the mobile wireless device:
decode at least one page indicator received on a page indicator channel through an initial antenna when a measured downlink signal quality exceeds a pre-determined threshold;
decode one or more page messages received on a paging channel through the initial antenna without decoding the page indicator channel when the measured downlink signal quality does not exceed the pre-determined threshold;
where the paging channel and the page indicator channel are separate;
decode one or more page messages received on the paging channel through an alternate antenna when a first page indicator received on the page indicator channel through the initial antenna decodes as an erasure value, where the erasure value indicates that an unequivocal value is not present; and
decode one or more page messages received on the paging channel through the initial antenna and through the alternate antenna together and ignoring the page indicator channel when no paging message received on the paging channel through the initial antenna or through the alternate antenna alone decodes with a correct error checking code for a pre-determined period of time during the discontinuous reception cycle.

10. The mobile wireless device as recited in claim 9, wherein the processor is further configured to:
decode one or more page messages received on the paging channel through the initial antenna and through the alternate antenna together during a subsequent discontinuous reception cycle after decoding an incorrect error checking code in the current discontinuous reception cycle.

11. The mobile wireless device as recited in claim 10, wherein the processor is further configured to:
ignore the page indicator channel when decoding using the initial antenna and the alternate antenna together.

12. The mobile wireless device as recited in claim 9, wherein the processor is further configured to:
switch from decoding the paging channel with one antenna to decoding with multiple antennas after measuring a first pre-determined number of incorrect consecutive error checking codes; and
switch from decoding the paging channel with multiple antennas to decoding the paging channel with one antenna after measuring a second pre-determined number of correct consecutive error checking codes.

13. The mobile wireless device as recited in claim 12, wherein the processor is further configured to:
measure the second pre-determined number of correct consecutive error checking codes by counting consecutive discontinuous reception cycles that contain at least one correct error checking code and no incorrect error checking codes.

14. The mobile wireless device as recited in claim 9, wherein the processor is further configured to:
before decoding the at least one page indicators on the page indicator channel, select the initial antenna from a plurality of antennas based on a measurement of signal strength received through each of the plurality of antennas.

15. The mobile wireless device as recited in claim 9, wherein:
the wireless network operates using a CDMA2000 1× communications protocol; and
the error checking code is a layer 2 CRC segment of a layer 2 paging channel message.

16. A non-transitory computer program product encoded in a non-transitory computer readable medium for adapting antenna receive diversity in a mobile wireless device in communication with a wireless network, the non-transitory computer program product comprising:
in the mobile wireless device, during a discontinuous reception cycle, non-transitory computer program code configured to:
decode at least one page indicator received on a page indicator channel through an initial antenna when a measured downlink signal quality exceeds a pre-determined threshold;
decode one or more page messages received on a paging channel through the initial antenna without decoding the page indicator channel when the measured downlink signal quality does not exceed the pre-determined threshold;
where the paging channel and the page indicator channel are separate;
decode one or more page messages received on the paging channel through an alternate antenna when a first page indicator received on the page indicator channel through the initial antenna decodes as an erasure value, where the erasure value indicates that an unequivocal value is not present; and
decode one or more page messages received on the paging channel through the initial antenna and through the alternate antenna together and ignoring the page indicator channel when no paging message received on the paging channel through the initial antenna or through the alternate antenna alone decodes with a correct error checking code for a pre-determined period of time during the discontinuous reception cycle.

17. The non-transitory computer program product as recited in claim 16, wherein the non-transitory computer program code is further configured to:
  decode one or more page messages received on the paging channel through the initial antenna and through the alternate antenna together during a subsequent discontinuous reception cycle after decoding an incorrect error checking code in the current discontinuous reception cycle.

18. The non-transitory computer program product as recited in claim 17, wherein the non-transitory computer program code is further configured to:
  ignore the page indicator channel when decoding using the initial antenna and the alternate antenna together.

19. The non-transitory computer program product as recited in claim 16, wherein the non-transitory computer program code is further configured to:
  switch from decoding the paging channel with one antenna to decoding with multiple antennas after measuring a first pre-determined number of incorrect consecutive error checking codes; and
  switch from decoding the paging channel with multiple antennas to decoding the paging channel with one antenna after measuring a second pre-determined number of correct consecutive error checking codes.

20. The non-transitory computer program product as recited in claim 19, wherein the non-transitory computer program code is further configured to:
  measure the second pre-determined number of correct consecutive error checking codes by counting consecutive discontinuous reception cycles that contain at least one correct error checking code and no incorrect error checking codes.

21. The non-transitory computer program product as recited in claim 16, wherein the non-transitory computer program code is further configured to:
  before decoding the at least one page indicators on the page indicator channel, select the initial antenna from a plurality of antennas based on a measurement of signal strength received through each of the plurality of antennas.

22. The non-transitory computer program product as recited in claim 16, wherein:
  the wireless network operates using a CDMA2000 1×communications protocol; and
  the error checking code is a layer 2 CRC segment of a layer 2 paging channel message.

\* \* \* \* \*